(12) United States Patent
Kelts

(10) Patent No.: US 8,046,804 B2
(45) Date of Patent: Oct. 25, 2011

(54) MEDIA USER INTERFACES USING METADATA FROM DIFFERENT SOURCES

(75) Inventor: Brett R. Kelts, Laguna Beach, CA (US)

(73) Assignee: Hillcrest Laboratories, Inc., Rockville, MD (US)

(*) Notice: Subject to any disclaimer, the term of this patent is extended or adjusted under 35 U.S.C. 154(b) by 860 days.

(21) Appl. No.: 11/981,162

(22) Filed: Oct. 31, 2007

(65) Prior Publication Data

US 2008/0060010 A1 Mar. 6, 2008

Related U.S. Application Data

(60) Division of application No. 11/432,161, filed on May 11, 2006, now Pat. No. 7,844,987, which is a continuation of application No. 09/829,263, filed on Apr. 9, 2001, now Pat. No. 7,139,983, which is a continuation-in-part of application No. 09/746,149, filed on Dec. 22, 2000, now abandoned.

(60) Provisional application No. 60/195,955, filed on Apr. 10, 2000.

(51) Int. Cl.
 *H04N 5/445* (2011.01)
 *G06F 3/00* (2006.01)
 *G06F 3/048* (2006.01)

(52) U.S. Cl. ............ 725/61; 725/43; 715/800; 715/815; 715/825

(58) Field of Classification Search .................. 725/61, 725/43; 715/800, 815, 825
 See application file for complete search history.

(56) References Cited

U.S. PATENT DOCUMENTS

| | | | |
|---|---|---|---|
| 4,745,402 A | 5/1988 | Auerbach |
| 5,021,976 A | 6/1991 | Wexelblat et al. |
| 5,045,843 A | 9/1991 | Hansen |
| 5,119,079 A | 6/1992 | Hube et al. |
| 5,341,466 A | 8/1994 | Perlin et al. |
| 5,359,348 A | 10/1994 | Pilcher et al. |
| 5,524,195 A | 6/1996 | Clanton, III et al. |
| 5,524,196 A | 6/1996 | Blades |
| 5,561,444 A | 10/1996 | Johnston et al. |
| 5,586,237 A | 12/1996 | Baecker et al. |

(Continued)

FOREIGN PATENT DOCUMENTS

GB 2 237 911 A 5/1991

(Continued)

OTHER PUBLICATIONS

Web archive printout, "What is UBUBU?" (http://web.archive.org/web/20000619235153/www.ububu.com/what/index.html).

(Continued)

*Primary Examiner* — Hoang-Vu A Nguyen-Ba

(74) *Attorney, Agent, or Firm* — Potomac Patent Group PLLC

(57) ABSTRACT

A navigation interface display system generates a navigation element that organizes television programming data in an easy-to-use manner. The navigation element employs a hierarchical display protocol for a plurality of selection items that represent the various television programs, channels, and/or networks. The hierarchical display scheme displays a limited number of active selection items at a first magnification level and additional active selection items at a second magnification level. In addition, the selection items are displayed on distinctive areas or features of the navigation element, where such features represent different content genres or categories. Subcategories can also be displayed in a hierarchical manner, thus providing additional information related to the content as the magnification level of the navigation element changes.

12 Claims, 13 Drawing Sheets

U.S. PATENT DOCUMENTS

| | | | |
|---|---|---|---|
| 5,596,699 A | 1/1997 | Driskell | |
| 5,638,523 A | 6/1997 | Mullet et al. | |
| 5,671,342 A | 9/1997 | Millier et al. | |
| 5,677,708 A | 10/1997 | Matthews, III et al. | |
| 5,701,424 A | 12/1997 | Atkinson | |
| 5,706,448 A | 1/1998 | Blades | |
| 5,745,710 A | 4/1998 | Clanton, III et al. | |
| 5,790,121 A | 8/1998 | Sklar et al. | |
| 5,793,438 A | 8/1998 | Bedard | |
| 5,796,395 A | 8/1998 | de Hond | |
| 5,807,174 A | 9/1998 | Fukuhara et al. | |
| 5,835,156 A | 11/1998 | Blonstein et al. | |
| 5,886,697 A | 3/1999 | Naughton et al. | |
| 5,898,435 A | 4/1999 | Nagahara et al. | |
| 5,903,314 A | 5/1999 | Niijima et al. | |
| 5,912,612 A | 6/1999 | DeVolpi | |
| 5,912,668 A | 6/1999 | Sciammarella et al. | |
| 5,926,178 A | 7/1999 | Kurtenbach | |
| 5,926,230 A | 7/1999 | Niijima et al. | |
| 5,940,072 A | 8/1999 | Jahanghir et al. | |
| 5,955,988 A | 9/1999 | Blonstein et al. | |
| 5,956,035 A | 9/1999 | Sciammarella et al. | |
| 5,968,120 A | 10/1999 | Guedalia | |
| 5,978,043 A | 11/1999 | Blonstein et al. | |
| 5,982,369 A | 11/1999 | Sciammarella et al. | |
| 5,990,890 A | 11/1999 | Etheredge | |
| 6,002,394 A | 12/1999 | Schein et al. | |
| 6,005,578 A | 12/1999 | Cole | |
| 6,016,144 A | 1/2000 | Blonstein et al. | |
| 6,018,372 A | 1/2000 | Etheredge | |
| 6,034,661 A | 3/2000 | Servan-Scheiber et al. | |
| 6,034,684 A | 3/2000 | Proehl et al. | |
| 6,037,933 A | 3/2000 | Blonstein et al. | |
| 6,049,823 A | 4/2000 | Hwang | |
| 6,057,831 A | 5/2000 | Harms et al. | |
| 6,069,606 A | 5/2000 | Sciammarella et al. | |
| 6,081,266 A | 6/2000 | Sciammarella | |
| 6,088,031 A | 7/2000 | Lee et al. | |
| 6,092,076 A | 7/2000 | McDonough et al. | |
| 6,097,393 A | 8/2000 | Prouty, IV et al. | |
| 6,100,889 A | 8/2000 | Sciammarella | |
| 6,121,970 A | 9/2000 | Guedalia | |
| 6,154,199 A | 11/2000 | Butler | |
| 6,154,213 A | 11/2000 | Rennison et al. | |
| 6,154,723 A | 11/2000 | Cox et al. | |
| 6,160,551 A | 12/2000 | Naughton et al. | |
| 6,175,362 B1 | 1/2001 | Harms et al. | |
| 6,175,862 B1 | 1/2001 | Chen et al. | |
| 6,177,931 B1 | 1/2001 | Alexander et al. | |
| 6,181,333 B1 | 1/2001 | Chaney et al. | |
| 6,191,781 B1 | 2/2001 | Chaney et al. | |
| 6,195,089 B1 | 2/2001 | Chaney et al. | |
| 6,262,722 B1 | 7/2001 | Allison et al. | |
| 6,262,724 B1 | 7/2001 | Crow et al. | |
| 6,268,849 B1 | 7/2001 | Boyer et al. | |
| 6,281,940 B1 | 8/2001 | Sciammarella | |
| 6,295,646 B1 | 9/2001 | Goldschmidt Iki | |
| 6,314,575 B1 | 11/2001 | Billock et al. | |
| 6,330,858 B1 | 12/2001 | McDonough et al. | |
| 6,346,956 B2 | 2/2002 | Matsuda | |
| 6,349,257 B1 | 2/2002 | Liu et al. | |
| 6,369,837 B1 | 4/2002 | Schirmer | |
| 6,384,869 B1 | 5/2002 | Sciammarella et al. | |
| 6,385,542 B1 | 5/2002 | Millington | |
| 6,397,387 B1 | 5/2002 | Rosin et al. | |
| 6,400,406 B1 | 6/2002 | Kim | |
| 6,411,308 B1 | 6/2002 | Blonstein et al. | |
| 6,412,110 B1 | 6/2002 | Schein et al. | |
| 6,415,226 B1 | 7/2002 | Kozak | |
| 6,421,067 B1 | 7/2002 | Kamen et al. | |
| 6,426,761 B1 | 7/2002 | Kanevsky et al. | |
| 6,429,813 B2 | 8/2002 | Feigen | |
| 6,445,398 B1 | 9/2002 | Gerba et al. | |
| 6,448,987 B1 * | 9/2002 | Easty et al. | 715/834 |
| 6,452,609 B1 | 9/2002 | Katinsky et al. | |
| 6,525,732 B1 | 2/2003 | Gadh et al. | |
| 6,529,218 B2 | 3/2003 | Ogawa et al. | |
| 6,577,350 B1 | 6/2003 | Prochl et al. | |
| 6,608,633 B1 | 8/2003 | Sciammarella et al. | |
| 6,621,452 B2 | 9/2003 | Knockeart et al. | |
| 6,678,891 B1 | 1/2004 | Wilcox et al. | |
| 6,735,777 B1 | 5/2004 | Kim | |
| 6,753,849 B1 | 6/2004 | Curran et al. | |
| 6,765,598 B2 | 7/2004 | Kim | |
| 6,768,497 B2 | 7/2004 | Baar et al. | |
| 6,782,550 B1 * | 8/2004 | Cao | 725/39 |
| 6,819,344 B2 | 11/2004 | Robbins | |
| 6,850,256 B2 | 2/2005 | Crow et al. | |
| 6,978,472 B1 | 12/2005 | Nashida et al. | |
| 7,013,435 B2 | 3/2006 | Gallo et al. | |
| 7,050,955 B1 | 5/2006 | Carmel et al. | |
| 7,093,201 B2 | 8/2006 | Duarte | |
| 7,159,176 B2 | 1/2007 | Billmaier et al. | |
| 2002/0033848 A1 | 3/2002 | Sciammarella et al. | |
| 2002/0054129 A1 | 5/2002 | Heron et al. | |
| 2002/0054158 A1 | 5/2002 | Asami | |
| 2002/0057850 A1 | 5/2002 | Sirohey et al. | |
| 2002/0080151 A1 | 6/2002 | Venolia | |
| 2002/0112237 A1 | 8/2002 | Kelts | |
| 2002/0126121 A1 | 9/2002 | Robbins | |
| 2002/0129366 A1 | 9/2002 | Schein et al. | |
| 2003/0016248 A1 | 1/2003 | Hayes Ubillos | |
| 2003/0035074 A1 | 2/2003 | Dubil et al. | |
| 2003/0046557 A1 | 3/2003 | Miller et al. | |
| 2003/0086615 A1 | 5/2003 | Dance et al. | |
| 2003/0131356 A1 | 7/2003 | Proehl et al. | |
| 2003/0218637 A1 | 11/2003 | Sloo et al. | |
| 2004/0039496 A1 | 2/2004 | Dautelle | |
| 2004/0070631 A1 | 4/2004 | Brown et al. | |
| 2004/0123320 A1 | 6/2004 | Daily et al. | |
| 2004/0125121 A1 | 7/2004 | Pea et al. | |
| 2004/0131281 A1 | 7/2004 | Reiners | |
| 2004/0218894 A1 | 11/2004 | Harville et al. | |
| 2004/0268393 A1 | 12/2004 | Hunleth et al. | |
| 2005/0097474 A1 | 5/2005 | Accot | |
| 2005/0160377 A1 | 7/2005 | Sciammarella et al. | |
| 2005/0253806 A1 | 11/2005 | Liberty et al. | |
| 2006/0028446 A1 | 2/2006 | Liberty et al. | |
| 2006/0053448 A1 * | 3/2006 | Reichardt | 725/44 |

FOREIGN PATENT DOCUMENTS

WO    WO 98/43183    10/1998

OTHER PUBLICATIONS

Web archive printout, Home page for ububu.com (http://web.archive.org/web/20000619170255/www.ububu.com).

Web archive printout, About UBUBU: Company Info (http://web.archive.org/web/20000618110504/www.ububu.com/about/index.html).

USA Today article, "Special Report: Bringing a dot-com to life. UBUBU boldly launches start-up in cyberspace" (Jun. 19, 2000) (http://www.usatoday.com/money/dotcoms/dot003.html).

ZDNet article, "Bookmark this—UBUBU" (Mar. 6, 2000) (http://news.zdnet.com/2100-9595_22-106047.html).

Business Wire Article, "UBUBU Unveiled: A New, Entertaining Interface for the Web and PC Opens a New Frontier in Desktop . . ." (Mar. 6, 2000) (http://www.allbusiness.com/company-activities-management/product-management-branding/6398949-1.html).

Perlin, K., NYU Media Research Lab: Zooming User Interfaces: (1998/99) (http://mrl.nyu.edu/projects/zui).

Perlin, K., NYU Media Research Lab: Zooming Pad Demo: (1998/99) (http://mrl.nyu.edu/~perlin/zoom/TestButton.html).

Perlin, K., NYU Media Research Lab: Pad Web Navigation Demo: (1998/99) (http://mrl.nyu.edu/~perlin/zoom/SiteTourHome.html).

Pike, J., "IMACTS—Imagery Management and Communications Testbed System," (http://www.fas.org/irp/program/process/imacts.htm) Jul. 1997.

Zoomify License Agreement (http://www.zoomify.com/zoomifylicenseagreement.htm).

Quesenbery, W., et al., Designing for Interactive Television, http://www.wqusability.com/articles/itv-design.html, 1996, pp. 1-6.

Prasar, V., Technology to the aid of science popularisation, http://www.vigyanprasar.com/dream/jan99/janvpinsight.htm, Jan. 1999, pp. 1-2.

Press Release, NetTV Selected for 800 Kansas City Classrooms, http://www.fno.org/mar98/NKCSDPR1.html, Mar. 23, 1998, pp. 1-2.

Fuerst, J., et al., Interactive Television: A Survey of the State of Research and the Proposal and Evaluation of a User Interface, http://wwwai.wu-wien.ac.at/~koch/stud/itv/paper.html, Jun. 1996, pp. 1-11.

Bier, E., et al., Toolglass and Magic Lenses: The See-Through Interface, Proceedings of Siggraph 93, Computer Graphics Annual Conference Series, ACM, Aug. 1993, pp. 73-80.

Stone, M., et al., The Movable Filter as a User Interface Tool, Proceedings of CHI '94, ACM, Apr. 24-28, 1994, pp. 306-312.

Bier, E., et al., A Taxonomy of See-Through Tools, Proceedings of CHI '94, ACM, Apr. 24-28, 1994, pp. 358-364.

Fishkin, K., et al., Enhanced Dynamic Queries via Movable Filters, pp. 1-6.

Bederson, B., Quantum Treemaps and Bubblemaps for a Zoomable Image Browser, UIST 2001, ACM Symposium on User Interface Software and Technology, CHI Letters 3(2), pp. 71-80.

International Search Report for PCT/US04/14487, mailed Feb. 9, 2005.

Written Opinion of the International Searching Authority for PCT/US04/14487, mailed Feb. 9, 2005.

User interfaces and documentation [online]. RealNetworks, Inc., 1995-1999 [retrieved on Jan. 29, 2001]. Retrieved from the Internet: <www.real.com>.

User interfaces and documentation [online]. Microsoft Corp., 2001 [retrieved on Jan. 29, 2001]. Retrieved from the Internet: <www.windowsmedia.com>.

User interfaces and documentation [online]. Nullsoft, Inc., 1999 [retrieved on Jan. 29, 2001]. Retrieved from the Internet: <www.shoutcast.com>.

User interfaces and documentation [online]. Yahool, Inc., 2001 [retrieved on Jan. 29, 2001]. Retrieved from the Internet: <www.broadcast.com>.

User interfaces and documentation [online]. Nanocosm, Inc., 2000 [retrieved on Jan. 29, 2001]. Retrieved from the Internet: <www.live365.com>.

User interfaces and documentation [online]. Launch Media, Inc., 1997-2001 [retrieved on Jan. 29, 2001]. Retrieved from the Internet: <www.launch.com>.

'Internet Radio' product information [online]. 3Com Corp., 2001 [retrieved on Jan. 29, 2001]. Retrieved from the Internet: <www.kerbango.com>.

'SonicBox' product information [online]. iM Networks, Inc., 2001 [retrieved on Jan. 29, 2001]. Retrieved from the Internet: <www.sonicbox.com>.

'RadioSpy' product information [online]. GameSpy Industries, Inc., 1999-2000 [retrieved on Jan. 29, 2001]. Retrieved from the Internet: <www.radiospy.com>.

'Visual Net' product information [online]. Antarctica Systems, Inc., 1999-2001 [retrieved on Jan. 29, 2001]. Retrieved from the Internet: <www.antarcti.ca>.

User interfaces and documentation [online]. MP3.com, Inc., 1996-2001 [retrieved on Jan. 29, 2001]. Retrieved from the Internet: <www.mp3.com>.

Verhoeven, A., et al., "Hypermedia on the Map: Spatial Hypermedia in HyperMap," International Conference on Information, Communications and Signal Processing, ICICS '97, Singapore, Sep. 9-12, 1997, pp. 589-592.

International Search Report for PCT/US01/08377, mailed Jul. 25, 2005.

International Search Report for PCT/US01/08331, mailed Nov. 13, 2002.

International Search Report for PCT/US01/08261, mailed Aug. 5, 2002.

User interfaces and documentation [online]. CenterSpan Communications Corp., 2000 [retrieved on Jan. 29, 2001]. Retrieved from the Internet: <www.scour.com>.

User interfaces and documentation [online]. UBUBU, Inc., 2000 [retrieved on Jan. 29, 2001]. Retrieved from the Internet: <www.ububu.com>.

Bederson, B., et al., "Advances in the Pad++ Zoomable Graphics Widget", USENIX Association in the 1995 Tcl/Tk Workshop Proceedings, 1995, 14 pages.

Bederson, B., et al., "A Zooming Web Browser", Computer Science Department, University of New Mexico, 1998, pp. 255-266.

Bederson, B., et al., "Pad++: A Zooming Graphical Interface for Exploring Alternate Interface Physics", ACM UIST'94, 1994, 10 pages.

Long, A.C., et al., "Video Editing Using Lenses and Semantic Zooming", Human Computer Interaction Institute, Carnegie Mellon University, 2002, pp. 1-9.

Mathukumarasamy, J., et al., "Visualizing Program Executions on Large Data Sets Using Semantic Zooming", College of Computing, Georgia Institute of Technology, Atlanta, 2002, pp. 1-16.

* cited by examiner

MEDIA USER INTERFACES USING METADATA FROM DIFFERENT SOURCES

CROSS REFERENCE TO RELATED APPLICATIONS

This application claims priority of U.S. provisional patent application Ser. No. 60/195,955, titled "Method and Apparatus for Providing Streaming Media in a Communication Network," filed Apr. 10, 2000. This application is a divisional of U.S. patent application Ser. No. 11/432,161, filed May 11, 2006 now U.S. Pat. No. 7,844,987, which is a continuation of U.S. patent application Ser. No. 09/829,263, filed Apr. 9, 2001 now U.S. Pat. No. 7,139,983, which is a continuation-in-part of U.S. patent application Ser. No. 09/746,149, titled "Interactive Display Interface for Information Objects," filed Dec. 22, 2000 now abandoned.

FIELD OF THE INVENTION

The present invention relates generally to interactive menu interfaces for identifying content provided via a communication system. More particularly, the present invention relates to a system for retrieving television programming information and for generating an interactive navigation interface for displaying such television programming information.

BACKGROUND OF THE INVENTION

The prior art is replete with communication and entertainment systems that provide information in different formats to many users. For example, digital cable and satellite television systems, which are now commonplace, can transmit audio and video content to a single home using hundreds of different channels; the large number of video and music channels can be overwhelming to many users. Instead of a relatively small number of traditional radio and television stations available in major metropolitan markets or via standard cable or satellite systems, users are presented with thousands of possibilities. Never before has there been such a vast selection of alternatives, with broadcasters providing every imaginable permutation for every conceivable area of interest, from mainstream popular music to the most obscure and unlikely niches.

Television viewers often have difficulty searching, locating, viewing, and recording suitable content due to the vast number of available channels and/or content sources. For example, the large quantity of available broadcast stations presents a paradox: while users undoubtedly benefit from the unprecedented number of choices in genre and content which broadcasters provide, they cannot easily and efficiently select from among the hundreds of stations, channels, and/or entities broadcasting a given type of music, video, or program. In addition, viewers cannot identify what is interesting, relevant, or available, or determine other characteristics of the available broadcasts.

Current solutions employed in conjunction with cable television set-top boxes and satellite television decoders typically operate in a primitive manner. These devices usually display information in a text format or by showing every available station or channel in a long list. Due to the limited size and resolution of a television screen display, paging through long lists of channels can be a tedious and frustrating process. While this type of interface may arguably be considered adequate in many current environments, it is unsuitable for systems having a very large number of content providers, stations, and/or channels to choose from.

Accordingly, there is a need in the industry for an effective and intuitive system for locating, identifying, and displaying television programming, which may be provided by multiple information sources and service providers, via a communication network.

BRIEF SUMMARY OF THE INVENTION

The present invention provides a system for generating an interactive navigation interface for display at an end user device such as a television monitor. In accordance with a preferred embodiment, the end user device merely functions as a display element; the navigation interface itself is generated, maintained, and processed by one or more remote components, such as a server or a separate processing apparatus coupled to the display element. The navigation interface is configured to allow a user to intuitively, effectively, and easily determine the broadcast status associated with a large number of content providers, channels, stations, or the like. The navigation interface utilizes a magnification (zoom) feature along with a hierarchical protocol for the display of active selection items representing different information sources or programs. In this respect, the navigation interface displays only a limited number of active selection items at an initial magnification level and introduces additional active selection items as the magnification changes. The interactive navigation interface may include a number of additional features designed to enhance the display of useful information to the user and to make it easier for the user to view and locate appropriate content.

BRIEF DESCRIPTION OF THE DRAWINGS

A more complete understanding of the present invention may be derived by referring to the detailed description and claims when considered in conjunction with the following Figures, wherein like reference numbers refer to similar elements throughout the Figures.

DETAILED DESCRIPTION OF A PREFERRED EMBODIMENT

Figure 1:
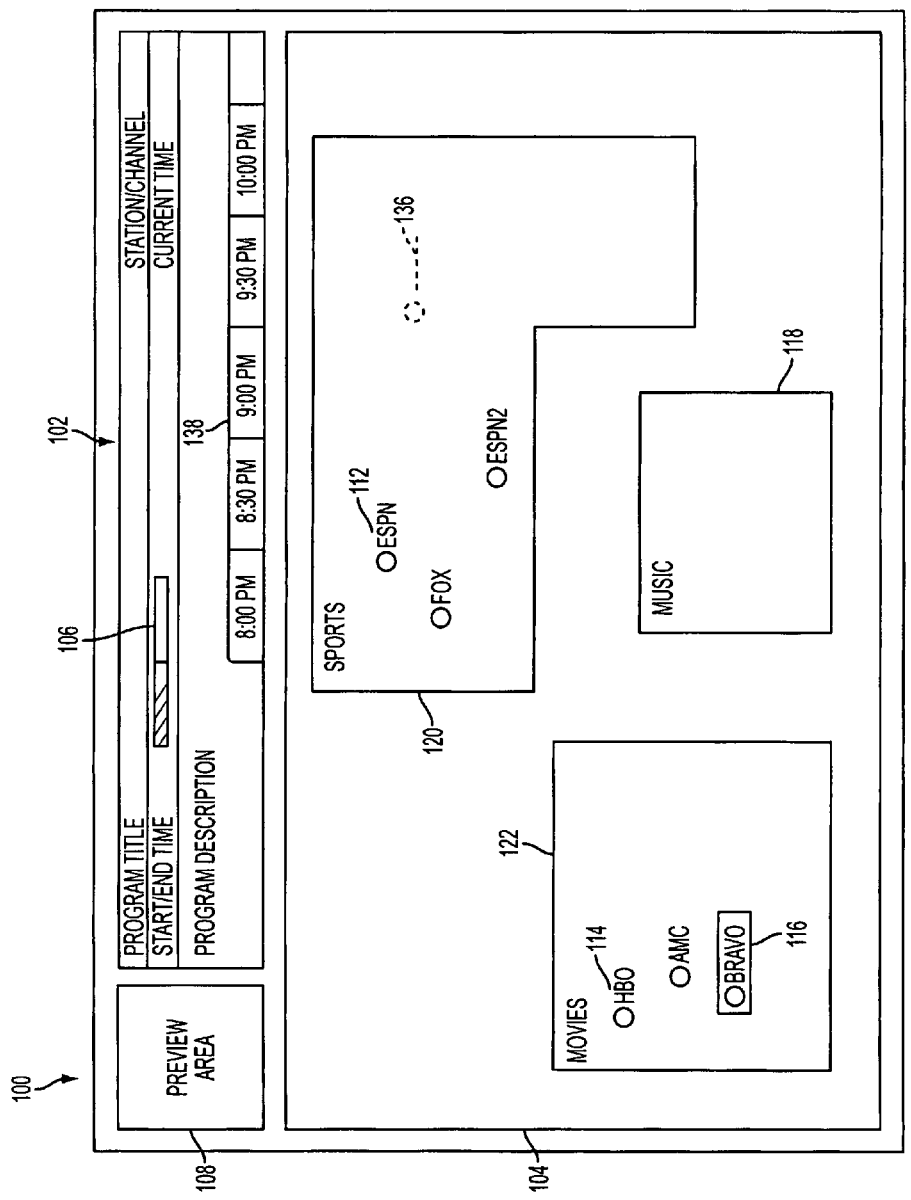
FIG. 1 depicts an exemplary navigation interface display screen at a relatively low magnification level.

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in conjunction with any number of data transmission protocols and that the systems described herein are merely exemplary applications for the invention.

It should be appreciated that the particular implementations shown and described herein are illustrative of the invention and its best mode and are not intended to otherwise limit the scope of the invention in any way. Indeed, for the sake of brevity, conventional techniques for signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical embodiment.

Overview

The present invention provides end users with an interactive navigation interface that makes it easy for the end users to view a plurality of graphical symbols, navigation objects, or selection items corresponding to different content sources, programming information, or the like. In practical deployments, the present invention is suitable for use in connection with television programming schedules, recorded programs, streaming media (audio and/or video) broadcast information, or the like. The present invention provides users with a graphical display metaphor that is easy to understand and is capable of organizing and displaying a large amount of information in an intuitive and easy-to-use format. The user's experience is enhanced by displaying the information using a suitable metaphor or theme that is graphical, dynamic, interactive, and enjoyable to use. For example, the program guide may utilize a geographical map analogy having navigation objects that appear as a number of islands or land masses corresponding to different programming genres. Alternatively, the program guide may categorize content using navigation objects that appear as representations of animals, buildings, vehicles, people, books, or any number of graphical objects. The interactive interface leverages spatial memory to allow users to quickly re-locate media items that they found during a previous viewing.

In lieu of a traditional list-based approach, the navigation interface displays programming information in conjunction with a hierarchy of graphical navigation objects generated in a format suitable for use with a television monitor. In the preferred implementation, the navigation interface features a mythical group of islands, each with a set of symbols or icons (referred to herein as "selection items") representing available broadcasters, service providers, program titles, broadcasting networks, or the like. In this preferred embodiment, different regions are labeled to represent a different genre or category, with related selection items located within the appropriate region. In addition, logical sub-regions represent subsets or subcategories of a genre. For example, one massive island representing sports programming may be identified as "Sports." One portion of this island may be dedicated to baseball, another may relate to golf, and so on.

The content guide can display features in a two-dimensional manner or in a three dimensional perspective. The end user can zoom in and out, select a categorized navigation object, select an active selection item to view additional information regarding the associated content, and access other related functions. In accordance with one aspect of the present invention, the content guide is dynamic in that it reflects real-time operating conditions and/or programming characteristics. For example, the appearance of the active selection items may change depending upon what content is being broadcast, the level of interest to the user, whether the selection items are marked as personal "favorites," or any other criteria.

In the preferred implementation, the interactive navigation interface employs a natural hierarchical scheme, which enables it to support thousands of media sources and channels without overwhelming the user. An analogy to this scheme is a roadmap where the most important information, e.g., major cities and highways, is displayed prominently and more obscure information, e.g., two-lane roads and small towns, is displayed in a less pronounced manner or perhaps only displayed on a more detailed (or magnified) map view.

A practical implementation of the present invention may reside in a number of software elements that reside at one or more processing locations. In accordance with one embodiment, the software is configured to operate in conjunction with any Java-based web server platform operating open database connectivity (ODBC) or SQL compliant data. This ensures that the back-end is highly scalable, robust, distributable, and easy to maintain. The interactive navigation system can be configured to be entirely server based and capable of automatically scaling its features to the capability of the client presentation device. Consequently, the end user need not perform any downloading, software installation, or hardware reconfiguring. In addition, ongoing maintenance, changes, and enhancements to the navigation interface system can be centralized at a server and can be made completely transparent to the end user. Alternatively, the navigation system can be configured such that most of the display processing and formatting is performed locally by the presentation layer. With this arrangement, the presentation layer need only communicate with a server to obtain programming data or to obtain modifications to general characteristics of the navigation interfaces, e.g., the graphical theme, the number of navigation objects, the number of selection items, the categorization of the selection items, and the like.

The system architecture is also capable of storing end user personalization data in an industry standard SQL data store. Thus, broadcast service providers employing the navigation system can use online analytical processing (OLAP) tools to extract critical demographic data about the end users, thus enabling more efficient marketing, advertising, and programming techniques. Accordingly, in addition to enhancing the users' experiences through pervasive personalization, service providers can learn more about the users' viewing habits and access patterns, which allows the service providers to deliver better services and, ultimately, generate more revenue.

In addition to the above features, the navigation system may be configured to cooperate with a set of authoring tools to allow the creation and management of navigation interfaces, XML configuration files to allow easy connection to legacy databases, and utilities to make deployment a simple process. In one practical embodiment, these additional tools may be accessed (via, e.g., the Internet) by the entity that deploys the navigation system architecture. Such tools may communicate with the system servers in a suitable manner to enable direct customization of interactive navigation interfaces by the broadcast service providers.

Navigation Interface Display

An exemplary navigation interface display screen 100 is depicted in FIG. 1. As described in more detail herein, the navigation system generates "navigation interfaces," "navigation elements," "navigation objects," and "selection items." As used herein, a "navigation interface" is generally defined as the overall graphical user interface, which may include any number of display screens corresponding to any number of different states. A "navigation element" is generally defined as that portion of a navigation interface that includes the navigation objects and selection items. In practice, the user manipulates navigation elements when viewing the program information. A "navigation object" is generally defined as a graphical feature rendered on a navigation element, while a "selection item" is generally defined as a graphical feature rendered on or proximate to a navigation object. Each of these graphical elements are described in more detail herein.

As described in more detail below, display 100 is preferably generated by a system configured in accordance with the present invention. Display 100 is shown and described herein for purposes of illustration; display 100 is not intended to limit or restrict the scope or applicability of the present invention in any way. Indeed, the specific configuration of display 100 may vary depending upon the particular application, system preferences, user preferences, and/or display device characteristics. For example, any number of the following (and other) features of display 100 may vary from application to application: the appearance of the graphical navigation objects displayed in the navigation element; the graphical theme employed by the navigation interface; the layout of the displayed navigation objects; the number or arrangement of the selection items on the navigation element; the number or arrangement of descriptive indicia on the navigation element; the size or shape of the various display elements; the colors used in display 100; and the type of media, content, or programming associated with the selection and control items.

In addition, the characteristics of the navigation interface display 100 may vary to accommodate different presentation devices. For example, display 100 may be suitable for use in connection with a remote control device having a limited number of directional navigation buttons, function keys, or menu buttons (such remote control devices are commonly used to control set-top converter boxes in cable and satellite television systems). Yet another embodiment may utilize a navigation interface display having relatively low resolution and reduced functionality to accommodate smaller presentation devices such as a remote control console having a small display screen.

Navigation interface display 100 may be subdivided into a number of general elements or components. For example, display 100 may generally include an information element 102 and a navigation element 104. As described in more detail below, information element 102 and navigation element 104 may each include or be associated with any number of additional functional elements or display elements. Briefly, navigation element 104 preferably includes a number of navigation objects that graphically represent a grouping of programs, and each navigation object may include any number of selection items associated therewith. The selection items preferably correspond to specific television programs available from the content provider.

Information element 102 preferably contains "live" or real-time information regarding the currently selected selection item and/or the currently selected navigation object. Such information may change in accordance with variations in the broadcast or programming status, the specific content requested by the user, or any other variable criteria. In various embodiments, the displayed selection items may represent any broadcast information, audio programs, television networks, pay per view programs, video on demand programs, locally recorded video programs, and any combination thereof. Accordingly, the content of information element 102 may vary depending on the particular application, and such content need not be limited any particular form of programming.

In accordance with the practical embodiment illustrated in FIG. 1, the displayed selection items represent cable or satellite television stations. In response to the selection of an active selection item on navigation element 104, information element 102 displays information related to the programming associated with the respective station. In this respect, the selection of an active selection item may prompt the display of additional data or cause the navigation display system to perform further related processes. For example, information element 102 may contain the station, network, or channel name, a station identifier such as an alphanumeric character string, an icon or logo associated with the station or program, the title of the program currently being broadcast, the start and end times of the program, and/or a brief description or summary of the program.

Information element 102 may also include a duration indicator 106 that graphically indicates, in real time, the amount of time remaining in the program, the amount of time elapsed, and/or the total duration of the program. The operation of duration indicator 106 is described in more detail below in connection with FIGS. 4 and 5. Information element 102 may also include a preview area 108 (e.g., a "picture-in-picture" window) for displaying a live video feed of a selected program.

In addition to the above features, information element 102 (or other elements of display 100) may include any number of features, including: additional pull-down or pop-up information related to the listed programs; VCR or other audio or video recording control; bandwidth, signal strength, station reliability, or other quality of service parameters related to the transmission of the selected program; popularity ratings for the selected program; polling or rating inputs, which allow the user to rate the station or program; and adding stations to the user's list of "favorites." Information element 102 may also leverage known program listing technologies and formats to provide a rich and user-friendly navigation experience.

Remote Control Operation

The preferred embodiment described herein is suitable for use with a television system. Accordingly, the navigation system can be designed to accommodate remote control operations and functions. For the sake of convenience, a number of exemplary remote control commands and their respective functions will be described herein in connection with different features supported by the navigation system. It should be appreciated that the navigation system may be alternatively (or additionally) configured to support on-screen menu functions or an on-screen pointing device controlled by a remote control, a mouse, a touchpad, or the like.

A "guide" button on the remote control functions to activate a channel guide (the interface described herein) that allows the user to view, search, locate, and select a television program via a number of navigation objects and selection items. If the channel guide is currently displayed, the "guide" button can be activated to switch back into the full screen video mode.

Directional arrow buttons (e.g., up, down, right, and left arrows) on the remote control enable the user to navigate between navigation objects, selection items, menu items, lists, and the like. The specific function of each directional arrow button may vary depending upon the current state of display 100.

Forward and backward buttons on the remote control may be used to advance a time shift display element (described in more detail below) forward or backward in time. On many platforms with recording capabilities, these buttons may also function as the fast forward and rewind buttons.

"Zoom in" and "zoom out" buttons (e.g., buttons marked "+" and "−") on the remote control function to control the zoom or magnification level for the current navigation element or for specific navigation objects. On most platforms, these buttons can also function as the channel up/down buttons or the page up/down buttons, depending upon the current operating mode.

A "menu" button on the remote control may function in a conventional manner to pull up a main menu (or any designated menu) from any location or state within the navigation system.

A "jump" or "recall" button on the remote control preferably functions to immediately direct the user to a specific location maintained by the navigation system. For example, the user can enter an alphanumeric code (e.g., a three-digit number) that uniquely identifies a specific navigation object, then press the "jump" button to cause the navigation system to display the navigation object corresponding to the entered code. Thus, the user can memorize the codes corresponding to any number of navigation objects and use the "jump" button as a shortcut to traverse the navigation elements. The "jump" button may also function in a conventional manner (when the television system is in the normal viewing mode) to return to a previous channel or to jump between two channels.

A "display" button on the remote control may function to toggle the visibility of a schedule box (described below) or a channel listing corresponding to a highlighted selection item. This feature allows the user to quickly view a time schedule of programming for a selected channel or station. On most platforms, the "display" button can also be used in the viewing mode to show a summary of programming information for the current program.

A "select," "enter," or "OK" button on the remote control functions in a conventional manner to enable the user to select displayed items and to enable the user to activate features. For example, the "select" button can be used to select highlighted menu items, to activate viewing of a highlighted selection item, or the like.

A "context" button on the remote control allows the user to display content-specific information related to a selected navigation object or a selected navigation item. As described in more detail below, the "context" button may pull up a menu that lists the different operations available for a currently selected navigation object or item.

As mentioned above, a practical embodiment may utilize any number of remote control buttons that support different features of the navigation system. Some of these remote control buttons and their related functionalities may correspond to known or existing features. On the other hand, it may be necessary to enhance the existing functions of some remote control buttons to support the features described herein. In addition, the navigation system may utilize any number of remote control buttons and/or functions that do not appear on current remote control devices.

Dynamic Navigation Element

Navigation elements are suitably configured to provide the user with programming information in an easy-to-navigate manner. In the preferred mode of operation, navigation elements are dynamic in nature. For example, navigation element 104 may include, without limitation, any number of the following features: flashing icons or symbols; pop-up or pull-down icons, tables, text boxes, or labels that are responsive to user commands or to the movement and/or position of a cursor rendered on the display screen; symbols, such as selection items, having variable appearances that react to various criteria; program listing and descriptions that change in accordance with the user's navigation of the display; zooming (magnification) capabilities; and panning or scrolling capabilities. In addition, navigation element 104 may be dynamically updated in response to the real-time changes in program listings. As described above, the displayed selection items may represent various types of data or information depending upon the particular application of the invention. In this respect, the selection items can represent or be associated with broadcast information, radio programs, television or radio networks, pay per view programs, video on demand programs, locally recorded videos, and any combination thereof.

In one embodiment, the zooming feature facilitates the progressive scaling of a displayed navigation object (or a portion thereof) that gives the visual impression of movement of all or part of a display group toward or away from an observer (see the definition of "zooming" contained in the IBM Dictionary of Computing, $8^{th}$ edition, 1987). In other words, the zooming feature causes the display of the navigation element or navigation object to change from a distant view to a close view, and vice versa, as though the end user were manipulating a telescope, a magnifying glass, or a zoom lens of a camera. Alternatively, the zooming feature may enable the navigation system to display a plurality of navigation objects at a relatively low resolution on one display screen, one navigation object at a relatively higher resolution on another display screen, and a plurality of navigation sub-objects (corresponding to one navigation object) at yet a higher resolution on yet another display screen. Similarly, a panning feature can facilitate the progressive translating of a displayed navigation element (or a portion thereof) that gives the visual impression of lateral movement of the image (see the definition of "panning" contained in the IBM Dictionary of Computing, $8^{th}$ edition, 1987). These visual characteristics of the navigation element 104 provide a realistic visual simulation to the end user.

The particular "screen shot" shown in FIG. 1 reflects a moment frozen in time. At this moment, navigation element 104 is associated with a specific magnification level, e.g., the lowest magnification level. At this level of minimum magnification, the entire geography or "world" may be displayed with a limited number of visible and active selection items. Alternatively, at this level of minimum magnification, the categorized navigation objects can be displayed without any representative selection items displayed thereon (in such an embodiment, selection items can be displayed when the user increases the zoom or when the user selects a particular navigation object). With brief reference to FIG. 2, the same navigation interface display 100 is shown having a navigation element 110 depicted at a higher magnification level. In a practical embodiment, the navigation elements may be two dimensional renderings having three dimensional characteristics such as shading and perspective. Alternatively, the navigation elements may utilize three dimensional rendering and appropriate three dimensional navigation capabilities (zooming, panning, rolling, tilting, etc.).

For the example theme described herein, navigation element 104 may contain any number of distinct graphical features such as geographical land masses, oceans, islands, or continents. Such graphical features may contain streets, cities, buildings, rooms, landscapes, floor plans, and other elements. Of course, navigation interface display 100 need not employ a geographical map analogy; display 100 may utilize any suitable design or graphical features (e.g., labeling, icons, coloring, or grouping of navigation items) for purposes of categorization and organization of the various selection items that represent the available channels, programs, or networks. Consequently, in lieu of a geographical theme, display 100 may employ graphical objects and features that represent any suitable theme, e.g., a carnival theme, a solar system theme, an abstract theme, a container theme, a library theme, or the like. In the preferred embodiment, a plurality of symbols, rendered as selection items, are displayed in a distributed manner over navigation element 104. For example, navigation element 104 includes a selection item 112 representing the station ESPN, a selection item 114 representing the station HBO, a selection item 116 representing the station BRAVO, and a number of other selection items representing other stations or channels. Sets of selection items are displayed on or proximate to specific navigation objects of navigation element 104 and subsets of selection items may be displayed on or proximate to specific areas or regions within one navigation object.

Each navigation object on navigation element 104 may be labeled to represent a different genre, category, or subject, with appropriate selection items displayed on or near a related navigation object. For example, one navigation object 118 includes the label "Music" to identify that the associated selection items represent music stations, such as MTV, and VH1, or specific programming related to music. Another navigation object 120 includes the label "Sports" to identify that the resident selection items represent stations that broadcast sports programming or specific sports programs. Yet another navigation object 122 includes the indicia "Movies" to identify that the resident selection items represent stations that broadcast full-length motion pictures or specific movie programs. Although not necessarily shown in FIG. 1, navigation element 104 may include any number of labeled objects or regions, such as News, Movies, Family, Comedy, Shopping, and Network. In a practical embodiment, some stations or channels may have duplicate selection items associated with more than one navigation object or category.

In accordance with one preferred aspect of the present invention, the selection items may dynamically shift on a navigation element depending upon the current subject matter represented by the selection items. Thus, a navigation element may exhibit dynamic re-mapping of selection items onto different navigation objects in response to programming changes or other criteria. For example, a selection item representing the station HBO may appear on the "Movies" object 122 during the broadcast of a movie and automatically shift to the "Sports" object 120 if a sporting event is broadcast after the movie. In addition, different selection items may dynamically appear or disappear in response to the characteristics or availability of programming.

As depicted in FIG. 1, a given navigation object (e.g., "Music" object 118) may have no visible selection items displayed at any particular magnification level. Indeed, at the highest level, navigation element 104 may be configured such that no individual selection items are displayed. Whether or not a given navigation object includes selection items can be governed by any suitable criteria such as the number of available programs or channels, the popularity of the category, end user preferences, or the like.

Figure 3:
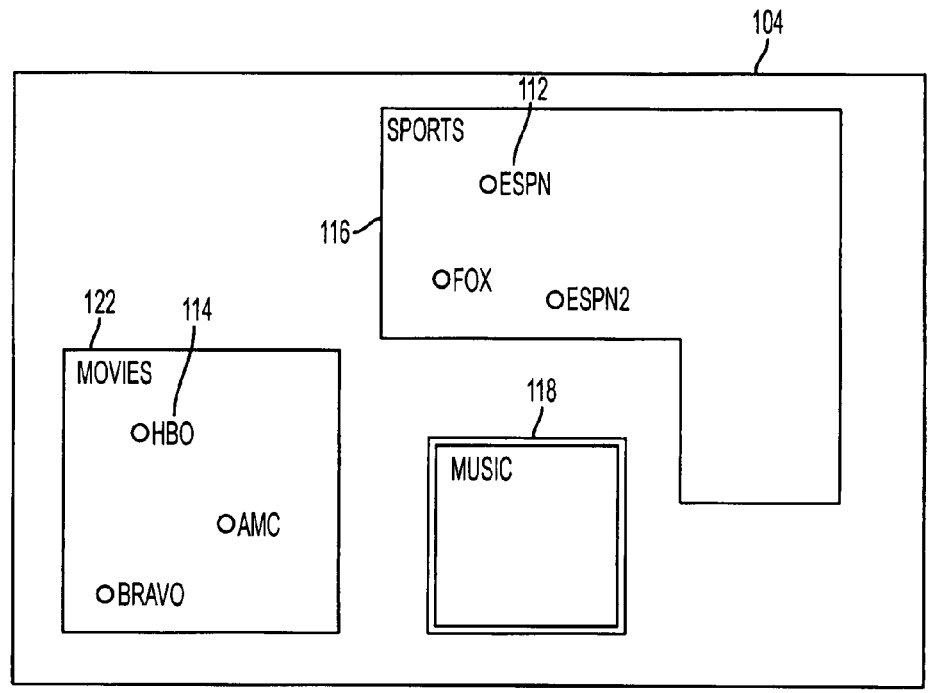
FIG. 3 is a portion of the navigation interface display screen of FIG. 1, representing a different display state.

As described above, a user can traverse navigation element 104 using a remote control device, and/or other user interface devices (e.g., a mouse, a keyboard, a trackball, a joystick, a touch pad, etc.). In accordance with one aspect of the present invention, navigation element 104 can be navigated and traversed in an intuitive and easy manner. The user may engage "zoom" buttons or directional buttons for purposes of zooming and selecting objects and items. The user can highlight a particular selection item and select that item to view the corresponding program. For example, FIG. 1 depicts selection item 116 (for the BRAVO channel) in a highlighted mode; the user may press the "select" or "enter" button to view this channel, press the "display" button to view the schedule box corresponding to this channel, or press the "context" button to view information related to the current program on this channel. In addition, the user can use the directional buttons to highlight a specific navigation object. For example, FIG. 3 depicts a different state of navigation element 104 in which navigation object 118 (the "Music" region) is selected. A practical embodiment may highlight the selected object or alter the appearance of the unselected objects and items to highlight the selected status. When a navigation object is highlighted, the user may press the "select" button or the "zoom" button to magnify the object, or press the "context" button to view information related to the category represented by the selected object. In practice, the navigation system allows the user to traverse between neighboring selection items and navigation objects, and the appearance of navigation element 104 may dynamically change as the user traverses between selection items and navigation objects.

Such zooming and repositioning may also be controlled by external events that do not require the user to initiate a zoom or positioning command. For example, the interface display system may receive a jump request to display the region labeled "Movies." In response, the navigation element 104 may be adjusted to focus on that region. Embodiments that implement continuous zooming and/or continuous panning may have intuitive navigation capabilities that allow the user to easily pan, zoom, or scroll over navigation element 104 using an interface device, e.g., by clicking and dragging the cursor to reposition navigation element 104.

As described above, many televisions and set-top converters are controlled by remote control devices having limited navigation capabilities (many of these devices merely include four directional control buttons). Traversing through an interactive interface can be difficult with such remote control devices, particularly when the interface display does not contain control points arranged in a grid pattern. In other words, it can be difficult for the user to ascertain which control point will be selected in response to any given directional button.

The navigation interface display system of the present invention may be suitably configured to generate guidance indicators on the navigation element. The guidance indicators provide visual guidance to the user, thus simplifying navigation of the display with a user device having limited navigation capabilities. In a practical embodiment, such guidance indicators can be rendered in the form of directional arrows. In operation, one selection item is the currently selected item or the item associated with the current position of the user's navigation device. The currently selected item may be highlighted to reflect that it is the current position. As shown in navigation element 104, a number of asymmetrically arranged selection items may surround a given selection item. Specific neighboring selection items can be associated with arrows pointing up, down, right, and left. These arrows rendered on the display provide immediate visual feedback to the user by indicating selection items, other than the currently highlighted item, to which the user can move. The navigation indicators are dynamic in nature; they automatically respond to movement of the current position by identifying the appropriate neighboring selection items.

The correspondence between selection items and directional indicators may be determined in a dynamic manner using any number of algorithms designed to find the "closest neighbors." Such an embodiment would allow automatic adaptation to the addition or subtraction of selection items. In an alternate embodiment, the navigation element may be initially designed with such guidance indicators coded along with the selection items. This technique may be suitable for use with navigation elements where the number and location of selection items are fixed.

It should be appreciated that the number of navigation indicators need not be limited to four and that the present invention may be flexibly configured to accommodate any number of discrete navigation directions. In addition, the navigation indicators need not be rendered as directional arrows. Alternate embodiments may employ any suitable pointing icon such as those rendered for use with a mouse cursor, colored markers, distinguishable icons, or the like. Indeed, some benefits may be derived by merely highlighting or indicating the neighboring selection items without specifically identifying the direction of travel required to reach them. Although the guidance indicators are utilized in the context of the navigation interface display system described herein, the technique may be implemented in any number of alternative navigation display systems. For example, the concept of guidance indicators may be employed in the context of video games, interactive DVDs, and other applications that rely on a remote control device having a discrete number of directional controls.

In a practical embodiment, the navigation of the displayed navigation element is responsive to directional control signals, magnification control signals, jump control signals, and other navigational control signals that may be initiated by the user. Such control signals may be directly processed by the respective presentation device or they may be suitably transmitted to a server for central processing and manipulation of the displayed navigation element. The processing of such control signals may be better understood in connection with the description of the hardware and software architecture of the navigation interface display system (see the description associated with FIGS. 6-8).

Hierarchical Characteristics

Each navigation interface is preferably designed to display its features in a hierarchical manner. Briefly, a navigation element exhibits a hierarchical categorization scheme associated with the grouping of the selection items and a hierarchical visibility scheme associated with the display of active selection items. Both of these hierarchical schemes will be described in detail with reference to FIGS. 1-3.

Figure 2:
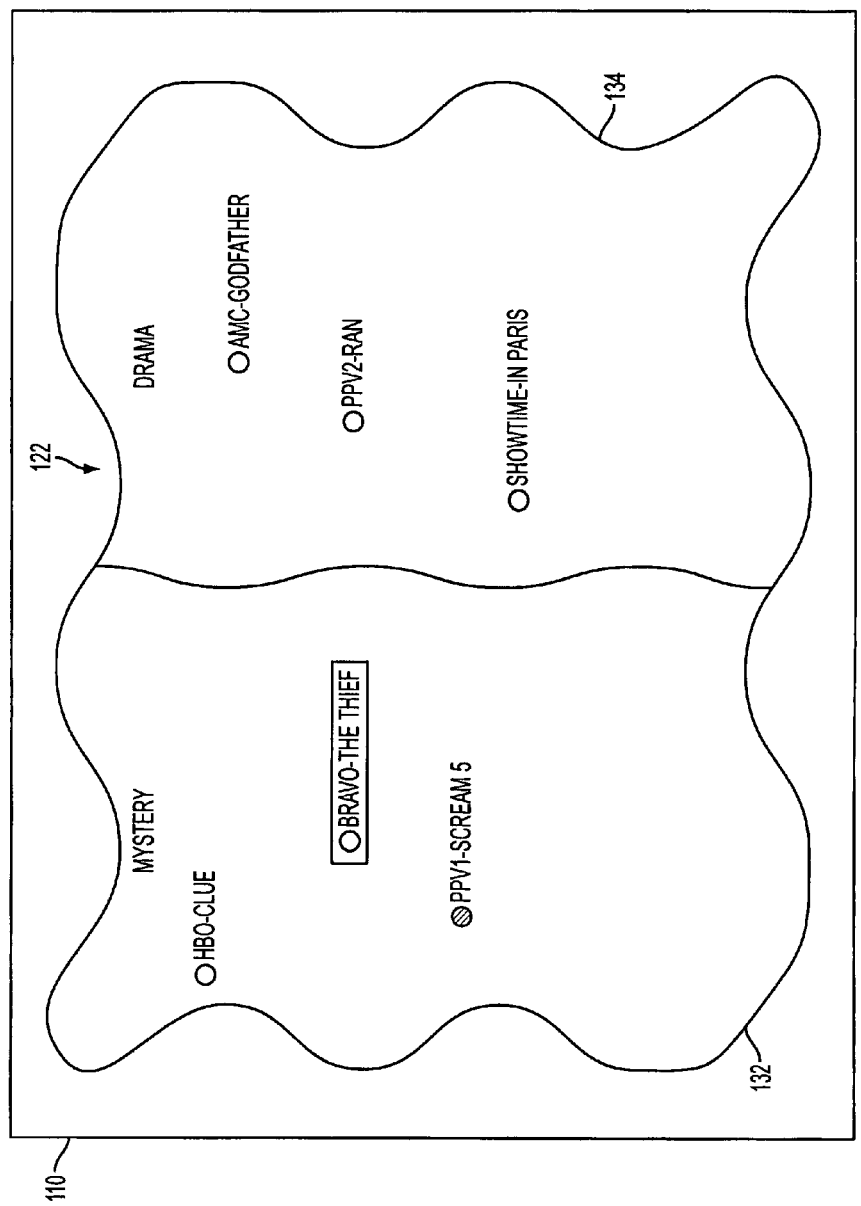
FIG. 2 depicts a portion of the navigation interface display screen of FIG. 1 at a relatively high magnification level.

As described above, individual selection items are preferably grouped according to a number of specified categories. Graphical features (the navigation objects in FIGS. 1-3) associated with the categories are displayed along with indicia representative of the genre or category. At a relatively low level of magnification (see FIG. 1), the preferred embodiment of the present invention displays broad categories such as Movies, News, and Sports. Those selection items located on or proximate to a given navigation object represent programs or stations that are generally related to that category. Thus, all of the selection items contained on or near navigation object 122 are associated with movies. In contrast, at a relatively high level of magnification (see FIG. 2), a given category may be further divided into one or more subcategories. In this respect, a first number of active selection items from the general category are displayed on or proximate to a first area of the navigation object and a second number of active selection items may be displayed on or proximate to a second area of the navigation object. In the context of FIG. 2, the general category of "Movies" includes the subcategories of "Mystery" and "Drama." Selection items located in or near to the "Mystery" navigation sub-object 132 represent mystery movies, while selection items located in or near to the "Drama" navigation sub-object 134 represent dramatic movies. Although not depicted in FIG. 3, the navigation element 110 may display navigation sub-objects as a cluster of distinct and separate objects, thus enhancing the relationship between the spatial layout of sub-objects and the corresponding sub-categories. In addition, any number of subcategories may be displayed at any given zoom level, and a navigation sub-object may be further divided into any number of hierarchical sub-sub-objects.

As described above, the navigation system may also support a "show category" or jump feature. This feature allows a user to select an individual category, navigation object, or navigation sub-object (usually via a "jump" button, a menu, a code sequence, the selection of an icon, or other functionality) while using the system. In response to the identification of a category (or subcategory), the display may be adjusted to focus on the selected category. When this feature is invoked, the selected category or subcategory is displayed near the center of the display element and, preferably, at the maximum possible magnification that allows all of the respective selection items to be shown. For example, FIG. 3 represents an exemplary display that may be generated in response to the selection of the "Movies" category. In an alternate embodiment, the "show category" feature may highlight the selected category or change the appearance of navigation objects and selection items outside of the selected category (e.g., by shading, coloring, dimming, or darkening such graphical features). The "show category" capability allows the user to quickly and easily view a desired category without having to pan, zoom, or otherwise traverse the displayed navigation element.

As the level of magnification increases, the level of detail on the navigation element may also increase. Thus, additional subcategories (and lower order subcategories) may begin to appear at higher magnification levels, along with additional selection items associated with the various subcategories. As more subcategories appear, the corresponding labels or other indicia of such additional subcategories may also appear on the respective area of the graphical navigation object or sub-object. This hierarchical display of categories, subcategories, and respective grouping of selection items allows the user to easily and intuitively locate and select appropriate programs by genre.

It should be appreciated that, in addition to categorizing according to areas or locations on the display, the navigation element can also categorize selection items in a hierarchical manner using any desired criteria. For example, a number of selection items may include a label or icon that identifies pay per view stations. These items can be further distinguished from other selection items by use of a different color or shading. The use of distinct labeling and distinct coloring in this context is akin to a sub-categorization scheme. Furthermore, because pay per view selection items may not be visible at a relatively lower magnification level (see FIG. 1), their display follows the hierarchical protocol described above in connection with the subdivision of the navigation objects and the display of subcategory labels.

With respect to the hierarchical visibility scheme, a relatively limited number of selection items are displayed at the lowest magnification level (see FIG. 1). In contrast, as the magnification level increases (see FIG. 3), more selection items become visible and more selection items become active. In the example navigation element 104 shown in FIG. 1, the Movies object 122 includes three active selection items. One of the active selection items, identified by reference number 116, represents a currently selected or highlighted item. The remaining active selection items on Movies object 122 (and on the other navigation objects shown in FIG. 1) may be subsequently selected by the user such that the related programming information can be displayed in information element 102 and/or in a pop-up window in navigation element 104.

At higher magnification levels, the number of active selection items associated with a given navigation object or category increases because active selection items displayed at relatively lower magnification levels remain displayed at higher magnification levels. In this respect, the active selection items associated with a relatively lower magnification level is a subset (preferably a proper subset) of the active selection items associated with a relatively higher magnification level. Accordingly, the number of active selection items associated with a relatively higher magnification level will be greater than the number of active selection items associated with a relatively lower magnification level.

In accordance with a preferred aspect of the invention, a number of inactive selection items may also be displayed at any given magnification level. For example, Sports object 120 includes an inactive selection item 136 displayed at the level shown in FIG. 1. The inactive selection item 136 is illustrated using dashed lines. Although inactive selection items are displayed, they have limited or no functionality. For example, inactive selection items may not be selectable by the user and they may not convey any information other than the information contained in the actual rendering of the inactive selection item. In a practical embodiment, the inactive selection items are rendered on the display element in a visually distinguishable manner relative to the active selection items. For example, the inactive selection items may be smaller than the active selection items and the inactive selection items may exhibit a faded or transparent characteristic relative to the active selection items. As used herein, "visually distinguishable" may relate to a different size, shape, color, shading, font, design, or other perceivable trait.

The inactive selection items at a given magnification level may identify those selection items that will become active at a higher magnification level. For the illustrated example that employs discrete levels, the inactive selection item 136 displayed in navigation element 104 (see FIG. 1) becomes an active selection item in the next highest magnification level (not shown). In addition, a number of new inactive selection items may become visible in the next highest level; in turn, these inactive selection items will become active selection items at the next highest magnification level. In an alternate embodiment that uses a "continuous" zoom feature, a given selection item may become active at a certain magnification point and remain active if the magnification remains substantially constant or if the magnification increases. The display of such inactive selection items allows a user to anticipate the programming information that will become available in response to increased zooming.

The order in which categories and subcategories are displayed in response to magnification changes, the order in which active and inactive selection items are displayed in response to magnification changes, and the selection of which items (active or inactive) are displayed at the lowest hierarchical magnification level may follow any suitable prioritization scheme or metric. For example, the prioritization metric can be based on the frequency of selection of the selection items by a user, thus resulting in frequently accessed selection items being displayed at the lowest magnification level and less frequently accessed selection items being delegated to relatively higher magnification levels. In an alternate embodiment, the prioritization scheme may be based on specified preferences that can be entered by the end user (e.g., the user may be allowed to promote or demote any given selection item) or by the service provider responsible for the maintenance of the navigation display system. This feature allows the service provider to highlight certain broadcasters, networks, genres, or categories in accordance with targeted marketing or focused programming. This feature also allows the end user to monitor or restrict access to certain programs, stations, or programming genres (e.g., in the context of a "parental lock" system). The prioritization scheme can be dynamically responsive to use patterns or programming changes in a manner that facilitates automatic updating of the navigation element characteristics. For example, if a user frequently visits a station, then that station will eventually move up in priority until it becomes displayed at the lowest magnification level and at each higher level.

Dynamic Selection Item Appearance

In accordance with another preferred aspect of the present invention, the active selection items (and/or other icons displayed on the navigation element) can be rendered in various ways to convey useful information to the user in an easy-to-interpret manner. In this respect, the selection items may have at least one variable characteristic associated therewith. The selection item appearance may be dynamically responsive to real-time changes in system status, user preferences, the current operating conditions related to the information source corresponding to the selection item, or the like. For example, different colored selection items may represent different types of programming genres, different programming characteristics, different transmission specifications, or the like. The appearance of the selection items may also be altered according to any of the following characteristics: broadcast status, i.e., whether the station is currently broadcasting a program; quality of service; connection bandwidth; service conditions; time until the start of the program (e.g., a rendering of a clock face); the program name; other programming information; etc. One or more of the following selection item icon characteristics may be varied in a dynamic manner: shape, size, color, design, orientation, text label, visibility factor, motion, etc.

As mentioned above, colored selection item icons represent active selection items while gray or "transparent" selection item icons represent inactive selection items. In addition, a pop-up text box may appear proximate a selection item when the user approaches the selection item with the cursor or other pointing device. The pop-up box may identify dynamically changing information such as the current program, song title, or channel name associated with that active selection item.

The dynamic appearance feature described above in connection with the selection items may also apply to text labels (or other information) that accompany the selection items. As described above, selection items are preferably displayed along with an indicator of the respective stations, networks, or the like. For example, one practical embodiment utilizes fixed labels, e.g., "HBO" for active selection item 114 and "ESPN" for active selection item 112. However, in an alternate embodiment, such labels may be dynamically configured to provide real-time programming, operating, or status information, such as the title of the program being broadcast, the time until broadcast, the time remaining in the program, the type of program, or the quality of service for the transmission of the program. The labels may also exhibit variable colors, fonts, styles, and other formatting.

Figure 4:
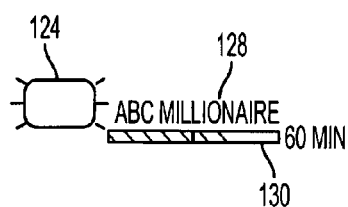
FIG. 4 is a schematic representation of an example selection item.
Figure 5:
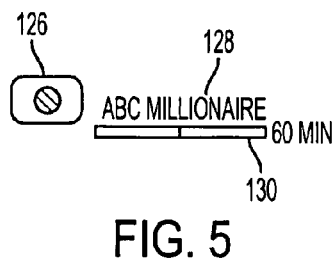
FIG. 5 is a schematic representation of an example selection item.

FIG. 4 and FIG. 5 depict example graphical representations corresponding to two selection items. Briefly, a selection item may include any number of the following components: a graphical icon; a label; and a duration indicator. The icon may be employed to designate the current state or status of the corresponding channel or program and/or the type of selection item that it represents. The navigation system employs differently sized, shaped, and colored icons to allow users to quickly identify and interpret selection items.

A practical embodiment may utilize different icons that represent at least the following types of selection items: live television (currently playing); live television (starting or not yet playing); live television (recording); live television (scheduled to record); television series (a show that plays multiple times); recorded content; live music station; and web content (on platforms that support internet access). The specific appearance of these different icons may vary from system to system. FIG. 4 depicts one example icon 124 that represents a live television show that is currently being broadcast. In contrast, FIG. 5 depicts one example icon 126 that represents a live television show to be recorded in the future.

A selection item may also include a label 128 that describes the program and/or channel corresponding to that selection item. The information contained in the label may vary depending upon the particular operating mode of the navigation system. In view of practical space limitations, a given label may contain a truncated version of a program title or summary, followed by a number of ellipses.

A selection item may also include a duration indicator 130. Duration indicator 130 is a graphical element that preferably represents the total length of the corresponding program and how far along it has progressed (based on the current time slice or reference time). The overall length of duration indicator 130 indicates the length of the program, which may also be displayed in an alphanumeric form next to duration indicator 130. Duration indicator 130 may be divided into segments that represent specific time increments, e.g., 30 minute increments. Thus, as shown in FIGS. 4 and 5, the current program runs for 60 minutes and duration indicator 130 includes two 30-minute segments.

When display 100 is used for live television programs, duration indicator 130 preferably includes two different colors, shades, or textures that represent the amount of time elapsed and the amount of time remaining in the current program. For example, in FIG. 4, duration indicator 130 includes a shaded portion (which may represent a first color such as red) and an unshaded portion (which may represent a second color such as green). The shaded portion represents the elapsed time of approximately 45 minutes and the unshaded portion represents the remaining time of approximately 15 minutes. In contrast, FIG. 5 shows duration indicator 130 in a totally unshaded state, which represents that the program has not yet started (or that it has just begun). In the preferred embodiment, the status of duration indicator 130 is updated continuously (or periodically) in real time to reflect the current status of the program. In practice, the navigation system obtains the relevant start and end time information for the respective program from an application database, retrieves the current actual time, and renders duration indicator 130 in response to the amount of elapsed time and/or the amount of remaining time.

As described above, information element 102 may also include a duration indicator 106 that functions in an equivalent manner. As the user travels through different selection items, duration indicator 106 changes to reflect the status of the currently selected item.

In the preferred practical embodiment, each active selection item (regardless of the current magnification display level) is rendered in a format that includes the various elements shown in FIGS. 4 and 5. Due to size limitations, these graphical elements are not shown in FIGS. 1-3 (rather, FIGS. 1-3 merely show a simplified icon and a short text label associated with the selection items).

Guide Formats

The navigation system may be configured such that a number of different guide formats are simultaneously supported. For example, the navigation system may include a main menu display having a number of graphical objects corresponding to any number of the following selectable options: a channel guide; a recorded content guide; a show guide; a surfer guide; and a favorites guide. Each of these guide formats is briefly described below. Generally, any of these guide formats may employ the display techniques described herein.

The channel guide displays television shows that are currently being broadcast and television shows that will be broadcast in the future. The channel guide organizes and categorizes individual channels and stations according to the general programming type carried by those stations. For example, ESPN and FOX SPORTS can be displayed on the Sports navigation object, while CBS, NBC, and ABC can be displayed on the Network navigation object, and CNN can be displayed on a News navigation object.

The recorded content guide displays programs that have been recorded by the platform (the recorded content guide is particularly suited for use with platforms that support digital video recording). In practice, the navigation objects can be organized and categorized according to the scheme used by the channel guide.

The show guide organizes, categorizes, and displays selection items according to subject matter or topic, regardless of how the channel guide may organize the individual channels. For example, the show guide may include a Sports object that includes selection items corresponding to network channels, local channels, news channels, and other channels, so long as the respective programming is related to sports. Thus, although ABC, NBC, and CBS reside on the Network object in the channel guide, any of those stations may reside on different objects in the show guide, depending upon the program subject matter.

The surfer guide sorts the available channels according to call letters, station numbers, or channel descriptions. In this respect, the surfer guide is similar to existing list-based programming guides. The sorting scheme used by the surfer guide can be selected by the viewer.

The favorites guide allows the viewer to create personal navigation objects that are categorized according to a specified scheme. The navigation system allows the viewer to assign a "favorite" status to any number of channels and to organize those favorites according to the techniques described herein. For example, while traversing the channel guide, the viewer may highlight a selection item and create a corresponding selection item for that channel in the favorites guide. The system also allows the user to create labels and categories for the favorite navigation objects.

General System Environment

Figure 6:
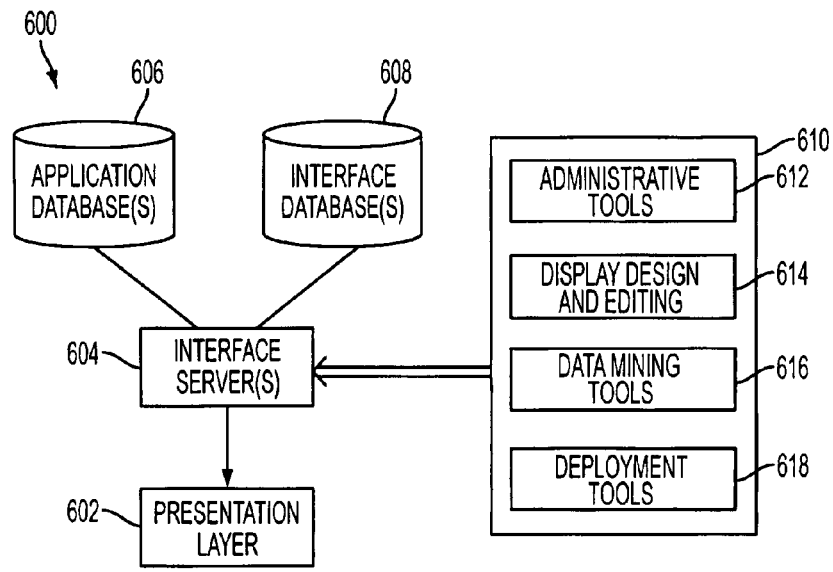
FIG. 6 is a schematic representation of a navigation interface display system in which the techniques of the present invention may be implemented.

FIG. 6 is a schematic representation of a navigation interface display system 600 in which the techniques of the present invention may be implemented. System 600 is suitably configured to produce, maintain, update, and control the navigation interface and the dynamic interface elements described above. System 600 is depicted in a generalized manner to reflect its flexible nature and ability to cooperate with any number of different communication systems, service providers, and display devices. System 600 may include a presentation layer 602 (preferably having an associated presentation device, display element, and application server), one or more interface servers 604, one or more application databases 606, one or more interface databases 608, and a suite of producer tools 610. In the context of FIG. 6, and for purposes of the example embodiment described herein, system 600 is associated with a particular system administrator, e.g., a cable television provider. Accordingly, some of the elements shown in FIG. 6 may be owned and/or maintained by the service provider.

As used herein, a "server" refers to a computing device or system configured to perform any number of functions and operations associated with navigation interface display system 600. Alternatively, a "server" may refer to software that performs the processes, methods, and/or techniques described herein. From a hardware perspective, system 600 may utilize any number of commercially available servers, e.g., the IBM AS/400, the IBM RS/6000, the SUN ENTERPRISE 5500, the COMPAQ PROLIANT ML570, and those available from UNISYS, DELL, HEWLETT-PACKARD, or the like. Such servers may run any suitable operating system such as UNIX, LINUX, or WINDOWS NT, and may employ any suitable number of microprocessor devices, e.g., the PENTIUM family of processors by INTEL or the processor devices commercially available from ADVANCED MICRO DEVICES, IBM, SUN MICROSYSTEMS, or MOTOROLA.

The server processors communicate with system memory (e.g., a suitable amount of random access memory), and an appropriate amount of storage or "permanent" memory. The permanent memory may include one or more hard disks, floppy disks, CD-ROM, DVD-ROM, magnetic tape, removable media, solid state memory devices, or combinations thereof. In accordance with known techniques, the operating system programs and any server application programs reside in the permanent memory and portions thereof may be loaded into the system memory during operation. In accordance with the practices of persons skilled in the art of computer programming, the present invention is described below with reference to symbolic representations of operations that may be performed by one or more servers associated with system 600. Such operations are sometimes referred to as being computer-executed. It will be appreciated that operations that are symbolically represented include the manipulation by the various microprocessor devices of electrical signals representing data bits at memory locations in the system memory, as well as other processing of signals. The memory locations where data bits are maintained are physical locations that have particular electrical, magnetic, optical, or organic properties corresponding to the data bits.

When implemented in software, various elements of the present invention are essentially the code segments that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

As used herein, a "presentation device" is any device or combination of devices capable of generating a visible display on an associated display element. For example, a presentation device may be a television set, a set-top box or converter associated with a television monitor, a personal computer, a video game console, a PDA, a remote control device, a home appliance, or the like. Presentation devices are preferably configured in conventional ways known to those skilled in the art. In addition, presentation devices may be suitably configured to function in accordance with certain aspects of the present invention, as described in more detail herein. For the sake of clarity and brevity, conventional and well-known aspects of such presentation devices are not described in detail herein.

A respective display element may be integral to a presentation device or a separate component in communication with a presentation device (e.g., a television monitor connected to a set-top converter). The specific configuration and resolution of the display elements may vary according to the type of presentation device that it cooperates with. For example, display elements may utilize cathode ray tube (CRT) technology, touch screen technology, liquid crystal display (LCD) technology, plasma display technology, or the like. In a practical application, a PDA display (such as those utilized by devices manufactured by PALM, INC.) have a resolution of 155×144 pixels with four shades of gray. On the other hand, most personal computers display 800×600 pixels with 24-bit color, and many of these systems include onboard 3-D acceleration hardware.

In the preferred embodiment, navigation interface display system 600 is capable of supporting a plurality of end users, each of which may have personal data or individual preferences and display settings associated therewith. In this respect, system 600 may be deployed by a cable television service provider having a large number of subscribers in a given locale. The different subscribers will likely have different presentation devices, different programming packages, and different user preferences; these user-specific characteristics may be suitably stored and managed by system 600.

Interface servers 604 may be generally configured to dynamically produce generic or universal representations of navigation interfaces according to the techniques of the present invention. As described in more detail below, interface servers 604 can utilize generic format descriptors, which enable different presentation layers 602 to suitably generate the graphical navigation elements according to the characteristics and specifications of the particular presentation devices and the associated display elements.

Interface servers 604 preferably communicate with one or more application databases 606, which may be external to the overall architecture of system 600. Application databases 606 are respectively associated with the presentation system corresponding to presentation device 602. For example, system 600 may operate in cooperation with a cable television application database that contains programming data relating to the programs and channels offered by the cable television service provider. Application databases 606 are preferably configured to communicate with interface servers 604 via TCP/IP in accordance with known techniques. In a practical embodiment, application databases 606 may be realized as conventional SQL databases, e.g., ORACLE-based databases.

The individual application databases 606 preferably contain broadcast and programming information such as cable television listings. The data stored in the various application databases 606 may include, without limitation, any of the following: (1) television station information, which may include station names, physical locations, current programs being broadcast, viewer maturity ratings (TV-Y, TV-14, TV-MA, etc.), encoding format (normal, high definition, Dolby stereo, etc.), network affiliations, pay per view pricing, subscription packages capable of receiving the broadcast, current status, program start/end times, and program descriptions; (2) radio station (traditional or cable) information, which may include station names, physical locations, current songs being played, uptime history, current status, and network affiliations; and (3) user information, which may include names, email addresses, account information (credits available, subscription packages, etc.), and preferences. In a practical system, the individual content providers and service providers will be responsible for updating and maintaining the data stored in application databases 606.

Interface servers 604 may also communicate with one or more interface databases 608, which may be considered to be part of system 600. Interface databases 608 may store user preferences related to the navigation interfaces, security information, station or channel lists, and other information specific to the particular service provider's implementation of system 600. Interface databases 608 may also contain data related to: the visibility of selection items (which may be stored on a per-user basis); the location of selection items (which may be stored on a per-user basis); virtual image identifiers corresponding to selection items; images for the interface elements; 3-D meshes for the interface elements; images for selection items; 3-D meshes for selection items; labels for selection items; and the like. As with application databases 606, interface databases 608 may communicate with interface servers 604 via TCP/IP, and interface databases 608 may be configured in accordance with known database technologies.

Producer Tools

Producer tools 610 are generally related to the design, modification, and deployment of the navigation interfaces. Producer tools 610 may also be related to administrative and monitoring tasks associated with the operation of system 600. Producer tools 610 are configured as software applications that enable the deploying entity to manipulate and customize the characteristics of system 600. In one embodiment, a number of producer tools 610 are network-based, i.e., the respective applications are accessible by service providers to enable system 600 to implement customizations via interface servers 604. In a practical deployment, producer tools 610 may be accessed via a standard web browser program such as INTERNET EXPLORER from MICROSOFT. Alternatively, a number of producer tools 610 may be stand-alone software applications that can be used to modify and customize certain aspects of system 600 in an "offline" manner. Such modifications and customizations can be subsequently uploaded to interface servers 604 for implementation.

The producer tools may include, without limitation, administrative tools 612, interface display design and editing tools 614, data mining tools 616, and deployment tools 618. Any of the producer tools may be manipulated by the entity responsible for the deployment, maintenance, and/or administration of the navigation interface display system 600 (the "system administrator"), a hosting entity, end users, network administrators, content providers, and/or any user having authorized access to the tools. Generally, the producer tools may be utilized to: design and configure the navigation interfaces; to monitor the status of the system; to analyze user data; and to manage the number of navigation interfaces supported by the system. In a practical embodiment of the present invention, the producer tools are configured as one or more software applications that are accessible by the system user. In this respect, the producer tools may be realized as one or more applications resident at interface servers 604, at a service site (not shown in FIG. 6) associated with the system user, at a service site (not shown in FIG. 6) associated with a hosting entity, at a presentation device, at a local stand-alone computing device associated with the system administrator, or at any suitable processing location operatively coupled to the navigation interface display system 600.

In accordance with one preferred embodiment, the producer tools are Internet-based, i.e., administrators of display system 600 can access and utilize the producer tools via an appropriate web site maintained by a third party host. Accordingly, in such an embodiment the producer tools need not be deployed as an integral part of interface servers 604 or in combination with any other portion of display system 600. In an alternate embodiment, any number of the producer tools can reside on interface servers 604. If the producer tools are realized as stand-alone applications, then the administrator of display system 600 can manipulate various parameters, settings, and characteristics of the navigation elements (and/or interface servers 604) in a local processing mode divorced from the operation of display system 600. Thereafter, any files, data, settings, or changed parameters can be communicated in any suitable manner to interface servers 604 for implementation.

Interface display design and editing tools 614 are preferably configured to allow the administrator of display system 600 to generate initial (or revised) parameters and characteristics of the navigation interfaces maintained by display system 600. For example, for a given navigation interface, the tools 614 may be used to select (or modify) the graphics, appearance characteristics, text, navigation object features, colors, hierarchical arrangement of selection items, display preferences, arrangement of displayed elements of the navigation display, and other features. After display design and editing tools 614 have been used to generate a navigation interface, the applicable navigation interface data is suitably copied to interface servers 604. In a practical embodiment, the navigation interface data is represented by XML data files, image files (at various resolutions and color depths), and/or 3-D meshes. As described above, design and editing tools 614 may be configured to represent the navigation interfaces using a generic or universal format recognized by interface servers 604.

Deployment tools 618 enable the system administrator to initiate use of navigation interfaces after they have been finalized by the design and editing tools 614. In operation, a system administrator may use deployment tools 618 to: verify the integrity of the designed navigation elements, objects, and selection items to be copied onto the interface system; copy images, 3-D meshes, and other data to the interface servers 604; and copy selection item information into the interface database 608 (which may include creating the appropriate database tables and indices, assigning zoom levels to selection items, and copying default values to user preferences).

After deployment of a navigation interface (preferably via deployment tools 618), the system administrator can utilize administrative tools 612 to perform various tasks associated with the operation of navigation interface display system 600. For example, administrative tools 612 are preferably configured to enable the use of filters for purposes of hiding or highlighting certain selection items (or for regulating content that may be accessed via the navigation interface). Administrative tools 612 also allow the system administrator to monitor the real-time status of the display system 600, including patterns of use by the individual end users. Administrative tools 612 may also be configured to accommodate any number of system control, system monitoring, network signaling, system regulation, and other features that may be desirable from a system administrator standpoint.

As described above, navigation interface display system 600 is preferably capable of gathering and processing data associated with end user preferences and use patterns. Accordingly, data mining tools 616 are suitably configured to extract, format, and otherwise process data associated with the use of display system 600. For example, data mining tools 616 may be accessed by a system administrator to estimate actual viewer or listener ratings regarding the overall popularity of certain broadcast stations. Data mining tools 616 can be configured to generate reports, charts, spreadsheets, and other documents that convey the desired information. In one embodiment, data mining tools 616 may be employed to provide information to interface servers 604 such that one or more navigation interfaces can be modified in real-time to reflect current end user preferences.

Server Interaction with Presentation Layers

Although not a requirement of the present invention, one practical embodiment of navigation interface display system 600 integrates the graphical interface operation with a server or a set of servers to enable additional functionality beyond that which would otherwise be associated with a stand-alone interface application resident only at the presentation device. The server-based implementation allows information to be displayed at the presentation devices in response to real-time changes in programming, broadcast, or network status (or in response to any changes in system 600), via continuous or intermittent updates from one or more servers. In addition, the presentation devices, the navigation interface display, and/or other devices within an end user's control can be monitored, reconfigured, or controlled indirectly by one or more servers or by other devices such as web browser applications. Furthermore, the server-driven interactivity allows a service provider or an end user to remotely add functionality to the navigation interface display (e.g., adding, removing, or moving selection items, changing the appearance of the displayed navigation interface, or changing the appearance of the selection items).

In the example embodiment, each of the presentation devices is associated with a presentation layer 602 that is responsible for the generation of the navigation interfaces for display on the particular presentation device. In this respect, a television can interact with a set-top presentation layer. Although not shown in FIG. 6, the presentation layer 602 may be associated with an application server that corresponds to the particular presentation system. Indeed, presentation layer 602 may include any number of physical components that cooperate to display navigation elements on the respective display element. Depending upon the particular presentation device, a presentation layer 602 may include software components residing at the respective application server, the presentation device itself, and/or at other hardware elements of the system. In addition, the "presentation layer" could be the device itself, e.g., a device may be solely designed to display navigation elements according to the present invention.

In operation, a presentation layer 602 can request a specific navigation element from interface servers 604 by designating a specific identifier associated with that navigation element. In response, the interface servers 604 generate or retrieve the identified navigation element and make it available for viewing by the end user or for downloading to the presentation device. In this manner, interface servers 604 can support any number of different navigation interface layouts associated with different end users and/or different presentation layers 602.

In a typical case, a navigation interface identifier describes a navigation element for loading by the presentation layer 602. The identifier can contain additional parameters that allow more specific requests related to portions or areas of the navigation element, e.g., a pointer to a particular sub-object rendered at a given magnification level.

As described herein, identifiers may identify navigation elements in a generic manner recognized by the interface servers 604. In this respect, the navigation interface system need not be aware of the source of the identifier; the interface servers 604 may respond to the request by providing the appropriate generic data back to the presentation layer 602 that originated the request.

In response to the request, the presentation layer 602 receives interface data that describes the requested navigation element. In one practical embodiment, the interface data is transferred in the form of an XML file (the specific format of this file may vary depending upon the particular system deployment). The interface data includes details about the requested navigation element, e.g., the selection items at the particular zoom level. The presentation layer 602 may also request specific navigation object images, selection item images, and other features for display.

Interface Server Architecture

Figure 7:
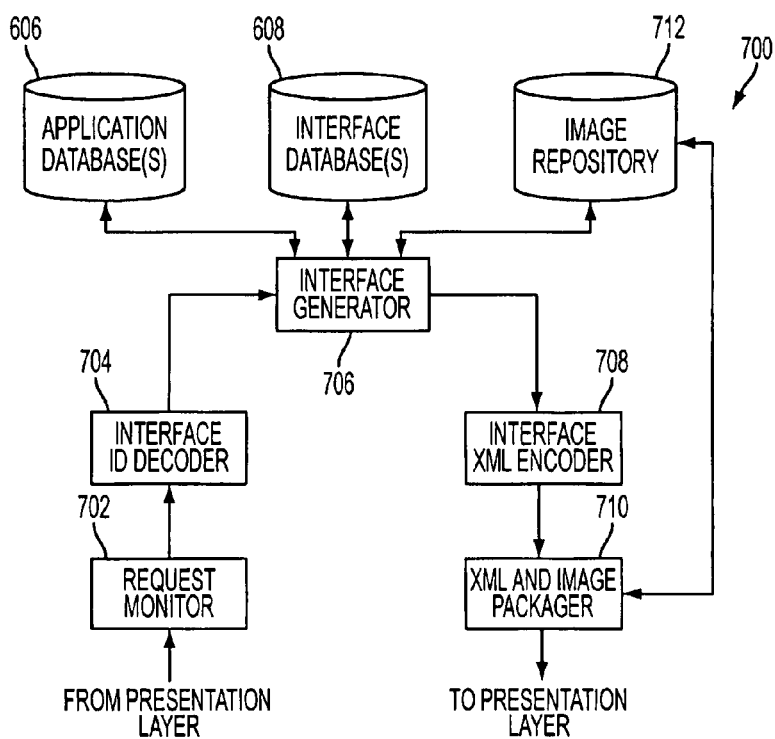
FIG. 7 is a schematic representation of an exemplary interface server architecture that may be utilized in the system shown in FIG. 6.

FIG. 7 is a schematic representation of an exemplary interface server architecture 700 that may be utilized in the system shown in FIG. 6. It should be appreciated that FIG. 7 depicts merely one suitable interface server arrangement; a practical embodiment can include additional or alternative functionality. For consistency, application databases 606 and interface databases 608 are also shown in FIG. 7.

Interface server architecture 700 may be configured to suitably receive and monitor requests generated by the presentation layer (see element 702). As shown in FIG. 6, interface servers 604 are preferably configured to receive requests from the presentation layer. The requests may include navigation interface requests represented by suitable identifiers or addresses. In accordance with a preferred practical embodiment, interface server architecture 700 includes an interface identifier decoder 704, which decodes the received identifiers for purposes of identifying and generating the corresponding navigation elements.

An interface generator 706 receives the decoded data from decoder 704 and interrogates application databases 606 and/or interface databases 608 to generate a suitable navigation element. An interface system XML encoder 708 processes the output of interface generator 706 to suitably transform the data into XML format. The XML data and any number of images stored in an image repository 712 are arranged in a packager 710 for communication to the respective presentation layer. In the preferred embodiment, the image repository 712 is a database containing bitmap images and three-dimensional meshes related to individual selection items, icons, labels, selection graphics, and other graphic elements which appear on the navigation interface. In this respect, image repository 712 may be configured as a data store containing all of the image content (selection item icons, the representation of specific navigation object features, and the like) that appears on each navigation element generated by the system.

The packager 710 is configured to combine the XML files generated by the interface system XML encoder 708 and images (such as selection items) from the image repository 712 into a single data package which can be sent to the presentation layer. In other words, the output of the XML encoder 708 may be considered to be a description of the requested navigation element minus the actual image data; the packager 710 combines this description with the image data into one file. In this manner, interface servers 604 are able to receive requests from the presentation layer 602, generate the corresponding navigation display data, and transmit the data and associated images back to the respective presentation layer 602.

The use of the layered architecture described above is desirable to allow one navigation interface display system to display common information on multiple presentation devices. In view of the different technologies available to an end user, e.g., the different ways to establish a connection with interface servers 604, the different levels of security, the different connection speeds, the different display elements, and the like, a practical system should be capable of supporting multiple interface configurations. In this respect, navigation interface display system 600 can be suitably configured to support a variety of different technologies, which are enabled based on the capabilities and specifications of the presentation devices and/or the preferences and desires of the end user. The display system 600 may be configured to automatically detect the capabilities of a particular end user presentation device and to "gracefully" or "seamlessly" reconfigure or reformat the navigation element rendering to provide the end user with an optimized experience.

To accommodate the different presentation device configurations, display system 600 may simply utilize the appropriate presentation layer. In the preferred embodiment, only the individual presentation layers 602 vary from application to application; the centralized server-based navigation system remains "generic" in nature. The flexible use of presentation layers is also advantageous from an upgrading standpoint. For example, display system 600 can be easily upgraded by adding presentation layers to support new presentation devices as they become available.

A number of the elements depicted in FIG. 7 may be incorporated in a local processor or a local rendering engine used by the presentation layer or the presentation device. For example, a television set-top box may employ local processing and rendering of navigation interfaces having the features and functions described herein.

If the presentation device or presentation layer supports local processing, then request monitor 702, decoder 704, interface generator 706, encoder 708, and packager 710 may all be realized at the local level (rather than at the server level). Information contained in interface databases 608 and/or in image repository 712 can be downloaded to one or more local memory elements or caches such that the presentation layer need not continually communicate with the system servers to obtain such information. Indeed, the interface and image data can be locally stored and processed for an indeterminate period of time and the system servers can be configured to transmit updated or new interface and image data as necessary to allow the presentation layer to render updated or new aspects of the navigation interfaces. For example, if a cable television provider adds a new programming category (and a corresponding new navigation object) to its navigation interface, then the system server may download the interface and image data for the new navigation object. On the other hand, if the navigation and image data remains static, then the presentation layer need only communicate with the system servers to obtain the real-time application data (e.g., the television programming data) from application databases 606.

Presentation Layer

In accordance with one preferred embodiment, the presentation devices communicate via any number of communication links with at least one application server associated with the respective presentation layer (the application servers are described below in connection with the presentation layer). As used in this description, a "communication link" may refer to the medium or channel of communication, in addition to the protocol used to carry out communication over the link. In general, a communication link may include, but is not limited to, a telephone line, a modem connection, an Internet connection, an Integrated Services Digital Network (ISDN) connection, an Asynchronous Transfer Mode (ATM) connection, a frame relay connection, an Ethernet connection, a coaxial connection, a fiber optic connection, satellite connections (e.g., Digital Satellite Services), wireless connections, radio frequency (RF) connections, electromagnetic links, two-way paging connections, and combinations thereof.

As described in more detail below, communication links may be suitably configured in accordance with the particular communication technologies and/or data transmission protocols associated with the given presentation device. For example, a communication link may utilize (without limitation) broadband data transmission techniques, the TCP/IP suite of protocols, WAP, WML, XML, HTML, or a combination thereof. Communication links may be established for continuous communication and data updating or for intermittent communication, depending upon the infrastructure. Application servers may be realized as a single hardware component or as a plurality of interconnected components (which may or may not be distributed over different physical locations).

Application servers generally function to translate the interface data received from interface servers 604 into formats suitable for use in conjunction with the native protocols associated with the respective presentation device. In this respect, system 600 may include an application server for each different presentation device. In the context of a practical deployment, a given application server may service a plurality of end users. For example, one application server may service a plurality of cable or satellite television set-top presentation devices for a group of different subscribers. For a given system 600, the application servers can be realized by one hardware component or by a plurality of hardware components distributed in different physical locations.

The application servers may be configured to communicate with interface servers 604 using the TCP/IP suite of protocols. In alternate embodiments, system 600 may utilize any data transmission scheme or protocol between the presentation layers and interface servers 604. In one practical implementation, each service provider or system operator maintains (or is associated with) a distinct interface server or a distinct collection of distributed interface servers. In accordance with one example embodiment, interface servers 604 are physically placed in a location remote from the presentation devices. Although not a requirement of the present invention, interface servers 604 and one or more of the application servers may be physically located in the same facility. Indeed, interface servers 604 and one or more of the application servers may reside on the same hardware device or on a single computer network. However, for practical reasons (and for purposes of scalability) multiple server devices may be preferred.

Figure 8:
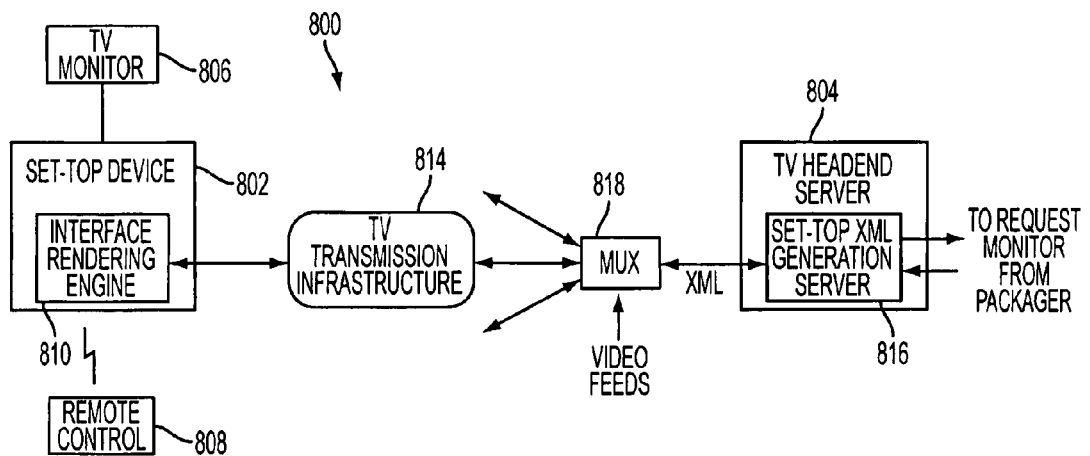
FIG. 8 is a schematic representation of a set-top presentation layer.

FIG. 8 is a schematic representation of an exemplary set-top presentation layer 800. In the context of a cable television or satellite television system, set-top presentation layer 800 preferably includes a set-top device 802 that communicates with a television headend server 804. In this respect, headend server 804 functions as an application server. Set-top device 802 may be a separate converter box or an integral component of a television set, a VCR, a decoder element, or the like. In a typical installation, set-top device 802 is located at the end user's premises. Accordingly, set-top device 802 may function in cooperation with a television display screen or monitor 806 and a control device, e.g., a remote control 808.

Set-top device 802 may include a rendering engine 810, an operating system (not shown), and any number of other software applications. The operating system is suitably configured to control the general operating functions of set-top device 802 in a conventional manner. In a practical embodiment, the operating system may be configured in accordance with any of the following known systems: WINDOWS CE, POWERTV, or VRTX. In many respects, set-top device 802 may function like a general purpose computer system to control the various television functions and to perform any number of additional operations. Accordingly, additional software applications may be related to email applications, web browser applications, program recording applications, television control applications, games, and the like.

Rendering engine 810 is an optional element of set-top presentation layer 800. However, the preferred embodiment utilizes rendering engine 810 to optimize the rendering of the navigation elements. Rendering engine 810 facilitates quicker operation because some of the graphics generation and manipulation is performed at the local layer rather than by the servers. The rendering engine 810 may be suitably configured to optimize the graphics according to the particular capabilities of the set-top device 802 and/or according to the specifications of the television display element 806. In this regard, the rendering engine 810 might request a 3-D mesh representation of the navigation element and then use a 3-D graphics processor located at the presentation device to render the navigation element in a 3-D format. In addition, rendering engine 810 may be configured to add functionality to the presentation layer 800. For example, local rendering may allow presentation layer 800 to cache the appearance of the entire navigation element locally, thus avoiding network latency associated with the transfer of a large number of images each time the user traverses the interface. This feature also allows the presentation layer 800 to quickly update only the navigation element portion of the display without having to devote resources to the regeneration of other displayed elements.

In the absence of rendering engine 810, set-top device 802 will simply respond to inputs received from headend server 804, where such inputs convey navigation interface display data. In this regard, headend server 804 can create HTML or XML navigation elements that are eventually displayed in connection with an application resident at the set-top device 802. Communication links 812 associated with set-top device 802 and the television transmission infrastructure 814 may be conventional broadband cable connections (carried by coaxial cables or fiber optic lines) or satellite links. In a practical application, headend server 804 may be deployed and maintained by the programming service provider. For example, headend server 804 may be located with the headend equipment maintained by a cable television service provider, where the headend equipment may service any number of end users.

Headend server 804 preferably includes a set-top generation server 816 and a server operating system (not shown). The operating system, which may be configured in accordance with known techniques, carries out the general operating tasks associated with headend server 804. The operating system preferably runs conventional server operating system programs, e.g., WINDOWS NT, LINUX, UNIX, or the like. In this respect, the server operating system is capable of communicating with the operating system used by set-top device 802.

Set-top generation server 816 is suitably configured to receive navigation interface data from interface servers 604 (e.g., from packager 710) and to translate such interface data into a native format or protocol associated with set-top device 802, e.g., a cable transmission protocol utilized by the cable service provider. End user requests may also be sent from generation server 816 to interface servers 604 (e.g., to request monitor 702). The server operating system, in conjunction with the set-top operating system and/or rendering engine 810, can process the interface display data in a suitable manner for displaying at television monitor 806. If set-top device 810 utilizes rendering engine 810, then generation server 816 may translate the generic data into a more compact format, e.g., XML, that can be read by the rendering engine 810 to generate the navigation elements. If no rendering engine is used, then generation server 816 may translate the generic data into an HTML representation that can be directly viewed in connection with an application on the set-top device 802.

The XML or HTML data generated by generation server 816 may be fed to a multiplexer 818. Multiplexer 818 may be configured in accordance with known techniques to mix the navigation display data with a number of video feeds. The mixed signals are then transmitted to the respective presentation device. For example, a cable television implementation may utilize a cable multiplexer that mixes the navigation display data with the video signals and transmits the mixed signal via a coaxial cable. In this manner, the XML or HTML data is ultimately encapsulated into data transmitted according to the television service provider communication protocol.

Miscellaneous Navigation System Features

Various embodiments of the navigation interface display system may employ additional functionality and features depending upon the particular application, user preferences, and/or the preferences of the service entity responsible for deploying the display system. The various hardware and software components described herein can be suitably configured to carry out these functions in addition to the general functions related to the generation and display of the navigation interfaces. The following system features are described in detail below: (1) filtering of selection items; (2) user data monitoring; (3) dynamic linking between the presentation layer and the navigation interface system; and (4) the display of "time-shifted" navigation maps.

The display system is preferably configured to allow the end user application (e.g., the operating system associated with the presentation device) to designate a subset of selection items to display for any given processing of a navigation element generation request. This feature enables applications to filter selection items during the generation process. During the filtering process, any property or characteristic of a selection item can be changed to reflect the filtered status, e.g., the visibility, location on the display, name, icon appearance, hierarchical ordering, or the like. The properties or characteristics that form the filtering criteria may be related to: the popularity of the selection item; the current broadcast status associated with the selection item; the quality of service associated with the transfer of content; language restrictions related to the content; whether the selection item is marked as a user favorite; the maturity rating associated with the content; whether the selection item represents free programming or pay per view programming; the programming times associated with the content; or whether the associated content is available as part of the user's subscription package. In accordance with one embodiment, each end user's view of the selection items can be unique because the filtering procedure can be individually carried out for each user. Consequently, the filtering feature can be used in a supervisory context to remove or hide selection items based on any number of criteria, e.g., programming for mature audiences may be screened from children.

In an alternate embodiment, the filtering feature may be cumulative or collaborative in nature such that selection items are filtered according to feedback associated with a plurality of end users rather than according to individual preferences or use habits. For example, the prioritization of display of selection items may be dictated by the aggregate preferences of a number of end users or by a statistical popularity rating based on a number of end users. In such an embodiment, a selection item that is generally popular among a large number of end users may be dynamically assigned a high level of visibility on all of the respective navigation elements.

The presentation layer 602 and/or the interface servers 604 can perform the filtering procedure. For example, in response to a navigation element request from presentation layer 602, the interface servers 604 may retrieve the display images, the navigation element data, and selection items associated with the requested navigation element. The interface servers 604 may then apply any global filtering (i.e., filtering that is automatically applied to a number of users) and any user-specified filtering to the requested navigation element. Such filtering may reduce the number of selection items or otherwise modify the navigation interface data retrieved by the system. The interface servers 604 subsequently transmit the filtered interface data to the presentation layer 602. At that time, the presentation layer 602 may apply any local filtering that is specific to the particular presentation layer, presentation device, or user preferences. Eventually, the presentation layer 602 represents the filtered data as required for rendering on the given presentation device.

A server-based deployment of the navigation interface display system enables the monitoring, collection, and processing of information related to the use of the navigation elements. For example, the display system servers can be suitably configured to maintain data related to the popularity of specific selection items, the popularity of different programming genres, demographic information, times of use, and other relevant data. This information can then be summarized using conventional or proprietary data mining techniques. The display system may provide remote access to the collected data by authorized parties.

As described above, the presentation layer 602 preferably establishes communication with the interface servers 604 via an address (or other suitable identifier) that identifies a particular navigation element maintained by interface servers 604, the display area, the user identification, and any other information desired by the presentation layer 602. In accordance with one practical aspect of the present invention, the presentation layer 602 is capable of assigning any number of additional "linking identifiers" to the given address. A linking identifier, which serves as a link to the presentation layer 602, may then be embedded into the data or code of another application. This feature gives the administrator or provider of the navigation interface display system the flexibility to assign another address to a given navigation element identifier. In other words, a given address can be made to point to a completely different navigation element if the system administrator decides to change the current navigation element. The dynamic linking aspect of the present invention provides a powerful mechanism to easily change navigation elements at the system level without having to update the application code and data resident at the presentation layers 602.

A navigation interface display may include an active element that allows the end user to shift the programming time associated with the given navigation element. For example, as described above in connection with FIGS. 1-3, an end user can conveniently determine what programs are currently being broadcast. In addition, a navigation element may include an information element 102 (see FIG. 1) that contains current and/or future programming information for a selected station or channel. However, many end users also like to see future programming information for more than one station or channel.

Figure 9:
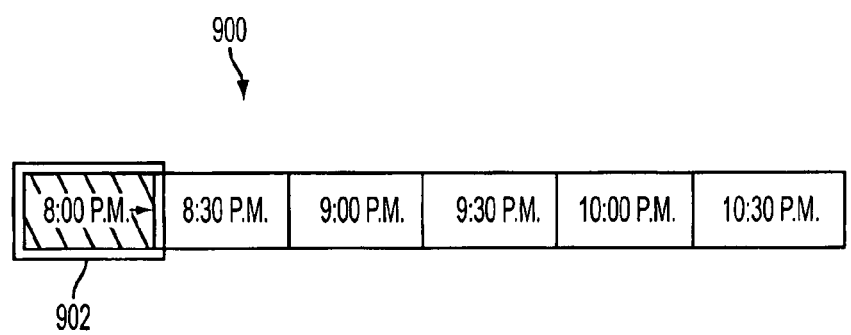
FIG. 9 is a schematic representation of a time-shifting element in a first state.
Figure 10:
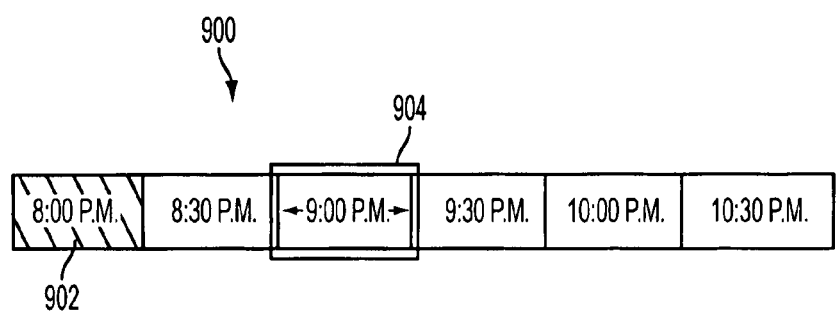
FIG. 10 is a schematic representation of a time-shifting element in a second state.

FIG. 9 is a schematic representation of an example time-shifting element 900 that may be rendered in connection with a navigation element, and FIG. 10 depicts element 900 in a modified state. FIG. 1 depicts an equivalent time-shifting element 138 rendered in connection with display 100. Time-shifting element 900 may display any number of specific program times before and/or after the current time slot. For example, time-shifting element 900 includes six half-hour time slots; the specific time slots may change as time progresses. Time-shifting element 900 preferably highlights, shades, colors, or otherwise indicates the time slot corresponding to the actual time. A current time slot 902 (8:00 PM) is shaded in FIGS. 9 and 10. Time-shifting element 900 is also rendered in a manner that indicates the current state of the displayed navigation element. For example, in FIG. 9, the current time slot 902 also corresponds to the currently displayed navigation element. However, in FIG. 10, the 9:00 PM time slot 904 corresponds to the currently displayed navigation element. Notably, time slot 904 is not shaded or colored because it does not indicate the present time period.

Figure 12:
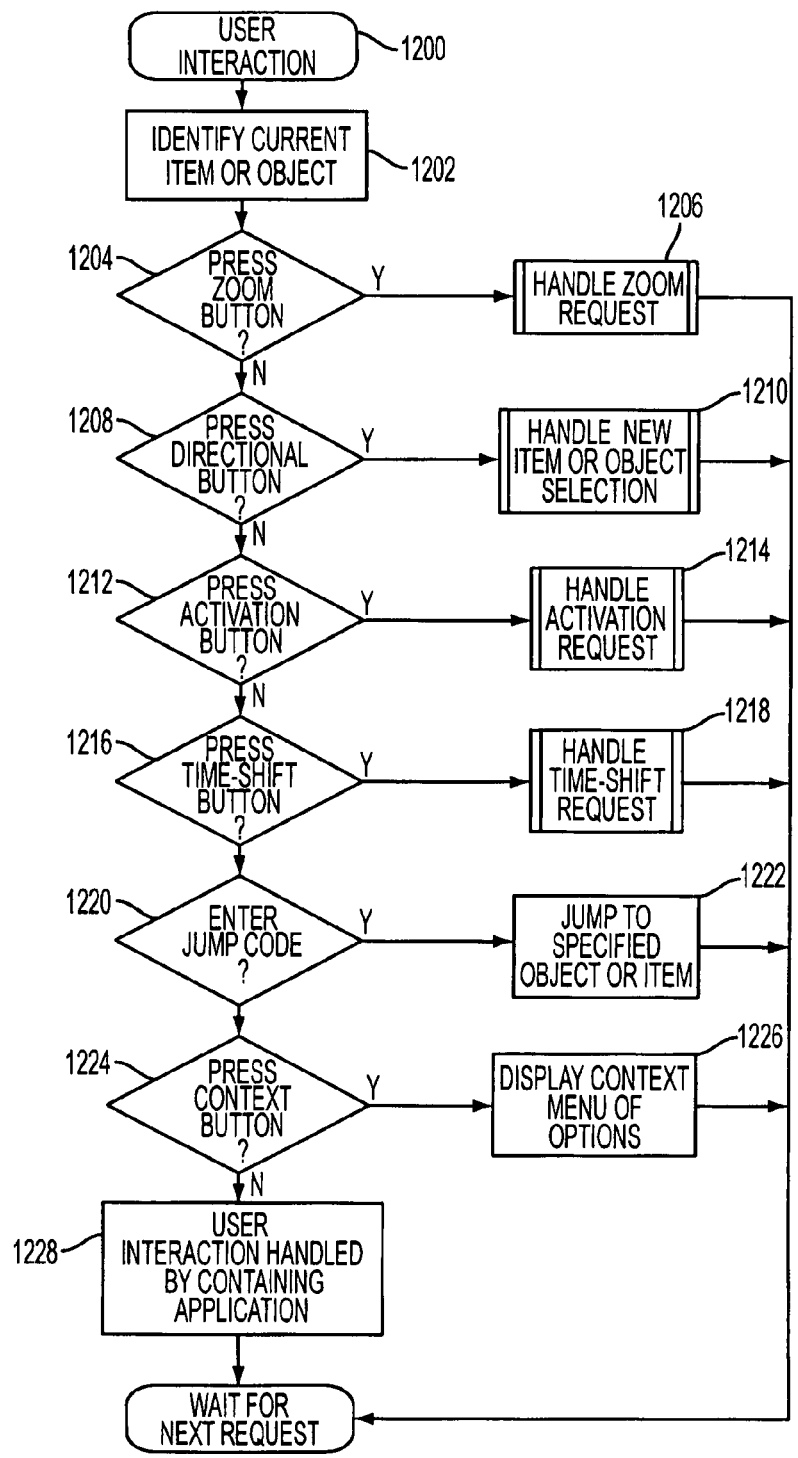
FIG. 12 is a flow diagram of a user interaction process.

In the preferred embodiment, the navigation system defaults to display a navigation element corresponding to the actual present time slot. However, the end user may change the time perspective by entering an appropriate command or request, e.g., by clicking on a different time slot on time-shifting element 900 or by engaging a suitable key on a keypad, such as a directional key. Time-shifting element 900 may include directional arrows that indicate whether the current time represented by the navigation element can be moved forward or backward in time. For example, FIG. 9 shows a forward arrow displayed in connection with the current 8:00 PM time slot 902 and FIG. 12 shows forward and reverse arrows displayed in connection with the future 9:00 PM time slot 904.

In response to a time-shifting request from the presentation device, the time-shifting element 900 will change to reflect the new time slot. In addition, the displayed navigation element will be modified to reflect the programming corresponding to the new time slot. For example, the appearance of the selection items, the content of selection item labels, the content of pop-up text boxes, the content of any preview windows, the station information, and/or the particular program information may change according to the programming data for the selected time slot. In this manner, the end user can continue to move forward (or backward) in time to view the program listings for different stations and channels at any number of time slots.

Operation of an Example Display System

The operation of a sample navigation interface display system according to the present invention will now be described with reference to the display screens depicted in FIGS. 1-3. It should be appreciated that the screens shown in FIGS. 1-3 and the following description of various user manipulations of the navigation interfaces are merely illustrative of one specific implementation of the present invention. Indeed, a practical embodiment can include any number of additional or alternative processing tasks and/or any number of different display navigation features.

Figure 11:
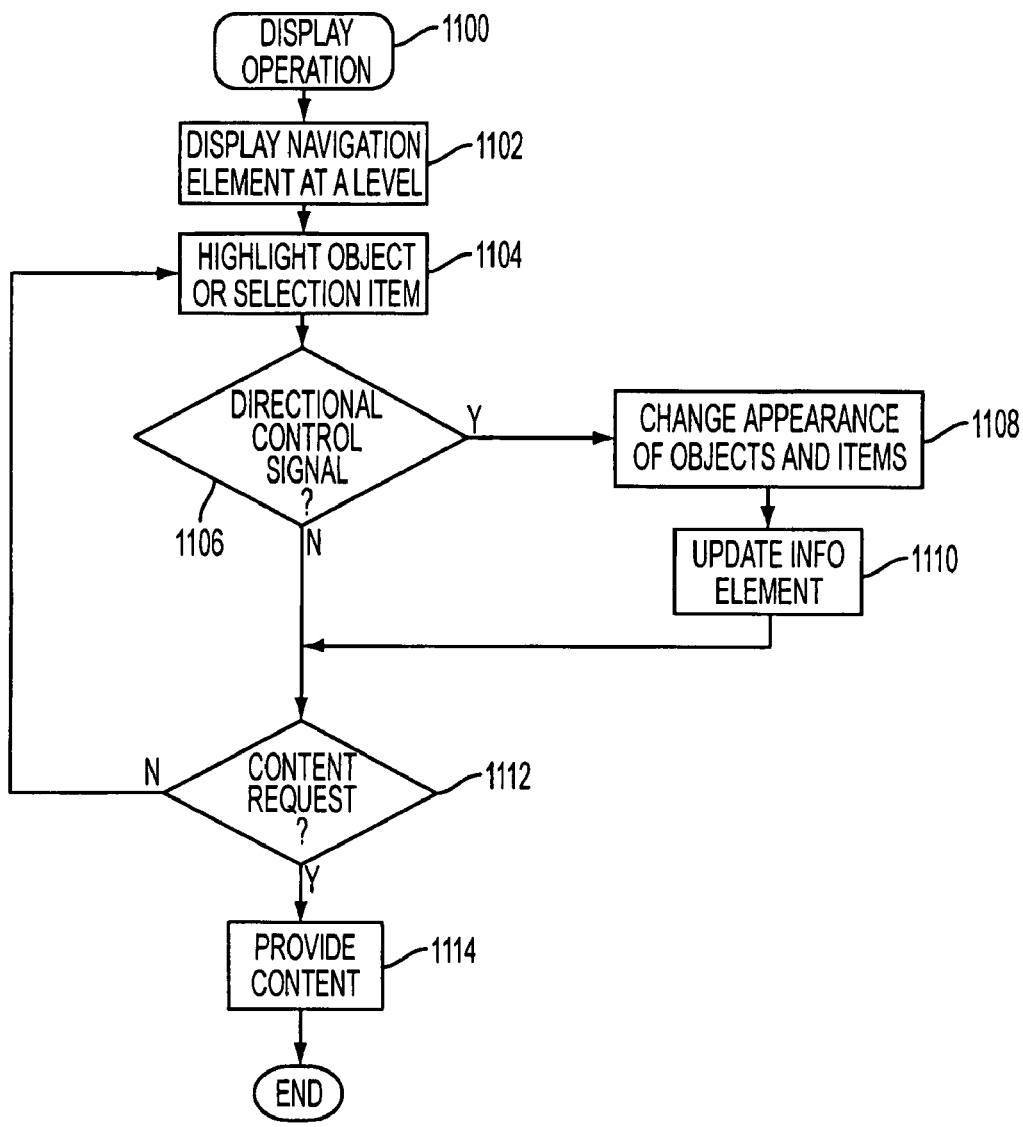
FIG. 11 is a flow diagram of a navigation element operation process according to one practical embodiment of the present invention.

FIG. 11 is a flow diagram of an exemplary display operation process 1100 that may be performed in the context of the present invention. For the sake of simplicity, process 1100 assumes that the current navigation element is being maintained at a constant magnification or zoom level. In other words, process 1100 does not contemplate changes in zoom (such changes are described below in connection with FIGS. 12 and 13). Accordingly, the features associated with process 1100 may be equivalently applied to any magnification level of a navigation element.

Display operation process 1100 begins by displaying a navigation element at a given magnification level (task 1102). For example, navigation element 104 (see FIG. 1) is associated with a low magnification level, i.e., at least one higher level of magnification remains. In the preferred embodiment, one navigation object or one selection item is highlighted (task 1104) on each navigation element to indicate the currently selected feature or the current position on the navigation element. In this regard, the appearance of the selected object or item differs from the appearance of the other objects and items, thus allowing the user to easily distinguish which navigation object or selection item has been selected. In connection with a query task 1106, if the presentation layer receives a directional control signal (which will usually be initiated by the end user of the presentation device), then a task 1108 is performed. Task 1108, which is preferably performed by the presentation layer and/or by the interface servers 604, changes the appearance of the newly selected navigation object or selection item. As described above, if a navigation object contains no displayed selection items at the current level, then the object itself may be selected in response to directional control signals. As mentioned above, the altered appearance may be desirable to provide a visual cue that a new navigation object or selection item has been selected. For example, upon selection of an active selection item, the example embodiment alters the background color and/or brightness of the selected item.

In addition to task 1108, the presentation layer and/or the navigation system may be configured to update the information element 102 (see FIG. 1) in response to the newly selected navigation object or selection item (task 1110). As described above, this updating may affect programming information such as the name of the program, the program start time, the network name, the channel or station number, or the like. When a navigation object is highlighted, information element 102 may be updated with the name of the navigation object and a brief description of the programs accessible via that navigation object. In the preferred embodiment, the information contained in information element 102 remains intact until a different active selection item (or navigation object) is selected or until the programming information for the same active selection item is updated (which may occur automatically as time progresses).

A query task 1112 may be performed to determine whether content associated with a selected item has been requested by the end user. In the example embodiment, the user can request a currently selected program by pressing a suitable button on the remote control, e.g., the "enter" button. If the presentation layer does not detect such a request, then display operation process 1100 may be re-entered at task 1104 to allow the end user to continue navigating the interface display. However, if a content request is received, then a task 1114 can be performed to provide the requested program to the end user in an appropriate manner. As described above, the specific type and format of the content associated with a selection item may vary depending upon how the display system is deployed. For example, an active selection item may link to a cable television program, a digital music file, a radio station, an on-demand pay per view movie, a web site, a locally recorded program, a digital picture, or the like. The processing of an activation request is also described below in connection with FIG. 12.

In connection with task 1114, the display system may prompt the presentation device to switch from the navigation display system mode to the presentation or view mode. For example, in a set-top television embodiment, task 1114 may cause the set-top presentation layer to display the selected program on the television monitor or in a portion thereof. The set-top television embodiment may also respond to task 1114 by displaying a pop-up menu that provides recording options to the user. In addition, the presentation layer may hide the navigation element from view or delegate it to a smaller portion of the display screen, e.g., in a picture-in-picture window. Yet another embodiment may prompt the presentation of the requested content on a display element or device that is controlled by, but distinct from, the navigation display system.

FIG. 12 is a flow diagram of a user interaction process 1200 that may be performed by the navigation interface display system. Process 1200 relates to a number of requests or commands that may be generated by the end user while interacting with a navigation element (thus, process 1200 may be performed in conjunction with display operation process 1100). Process 1200 contemplates end user interaction with a navigation display via a suitable remote control device, a keyboard, keypad, or other user interface. Such command entries may be associated with a single key entry, a key sequence, or a combination of key entries.

Initially, the display system identifies or highlights the current selection item or navigation object, as described above in connection with display operation process 1100 (task 1202). A query task 1204 determines whether the end user has pressed a "zoom" button, or an equivalent functional button, on the remote control. If so, then user interaction process 1200 may handle the zoom request (task 1206) in a suitable manner. An exemplary zoom request process is described below in connection with FIG. 13. If not, then process 1200 may proceed to a query task 1208 to determine whether the end user has pressed a directional button (e.g., an arrow key, a page up key, a page down key, etc.). As described above in connection with display operation process 1100, the navigation interface display system responds to the directional shift request by handling the new selection item or navigation object in a suitable manner (task 1210). Briefly, the new object or item may be visually highlighted to indicate that it is the currently selected feature.

If the end user presses an activation key (query task 1212), then user interaction process 1200 handles the activation request to provide the requested content to the end user (task 1214). In a practical embodiment, the activation key is the "ENTER" key and engaging the "ENTER" key causes the currently selected channel or station to be activated.

If the end user presses a time shift key (query task 1216), then user interaction process 1200 handles the time shifting request in a suitable manner (task 1218). For example, the system may perform a time shift request process as described below in connection with FIG. 14. In practice, any suitably designated key, key sequence, or combination of keys may be associated with the time shifting feature. For example, the end user may press a directional key to select an appropriate time slot, then press the "ENTER" key to activate the time shifting feature.

If the end user enters a particular jump code (query task 1220) or otherwise initiates a jump feature, then the navigation system may jump to the specified navigation object or selection item for immediate viewing by the user. As described above, the jump code may be an alphanumeric string having any number of characters. The jump feature allows the viewer to immediately view specific portions of any given navigation element.

If the end user presses a "context" button (query task 1224), then the navigation system preferably displays a context menu that includes a number of options corresponding to the current guide format and/or the currently selected navigation object or selection item. For example, in the channel guide mode, the context menu may include the following selectable options: watch program; record program; add channel to favorites; promote channel in the display hierarchy; and demote channel in the display hierarchy. The specific options contained in a context menu may vary depending upon the current display state of the navigation system.

If user interaction process 1200 does not detect or recognize a particular user interaction, then such interaction may be handled by one or more other applications (task 1228). For example, a containing application or an operating system may also control and process certain end user commands that affect the navigation display system or the rendering of elements on the navigation display.

After handling the current end user command or request, user interaction process 1200 may idle or wait for the next user request. Thus, the various handling procedures of process 1200 may be repeated as the end user interacts with the navigation display. It should be appreciated that a practical system may include any number of selectable or active display elements and features that respond to end user interaction. Indeed, the specific functions described above are not intended to limit or otherwise restrict the present invention, and a number of alternative or additional features may be incorporated into user interaction process 1200.

Figure 13:
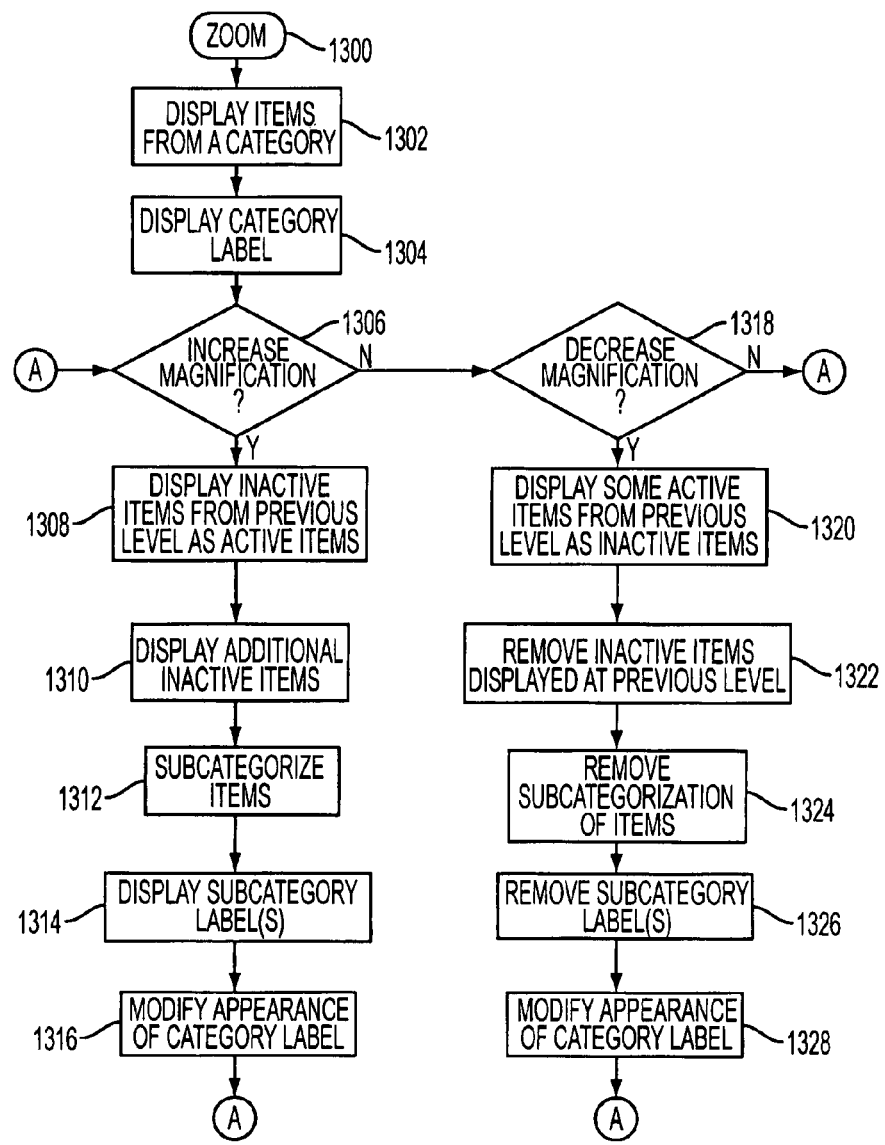
FIG. 13 is a flow diagram of a zoom process according to one practical embodiment of the present invention.

FIG. 13 is a flow diagram of an exemplary zoom process 1300 that may be performed in the context of the present invention. A task 1302 causes the navigation interface display system to suitably display a navigation object or sub-object along with a number of selection items associated with a category or sub-category. In this respect, task 1302 causes a navigation element to be displayed at a particular level of magnification. For illustrative purposes, process 1300 is described herein in the context of a number of discrete magnification levels. However, as mentioned above, the present invention is not limited to such an embodiment. Indeed, alternate embodiments of the invention may utilize a substantially seamless or continuous magnification scheme in lieu of designated levels. Those skilled in the art will appreciate that process 1300 can be modified for equivalent application to such alternate embodiments. In practice, the presentation layer and the presentation device performs the navigation element displaying tasks described herein.

For the sake of brevity and simplicity, process 1300 is described herein in the context of one category and one navigation object of a navigation element, namely, navigation object 122. In the example display screens shown in FIGS. 1 and 2, navigation object 122 is generally associated with the category "Movies." Of course, the features associated with process 1300 may be equivalently applied to any number of navigation objects, graphical features, selection items, and categories. In navigation element 104, navigation object 122 may be rendered with a number of active selection items (such as active selection item 114) and a number of inactive selection items (not shown). The distribution of active and inactive selection items on a navigation object may vary depending upon the current magnification level of the navigation element. For example, at the very lowest level of magnification, there may be little or no active selection items displayed. In contrast, at intermediate levels of magnification, there may be a blend of active and inactive selection items. In addition, at the highest level of magnification (which corresponds to the highest level of detail), there may be little or no inactive selection items displayed.

In addition to task 1302, zoom process 1300 may perform a task 1304 to suitably display a category label on or proximate to the navigation objects. In the example embodiment, navigation object 122 is identified by the category label "Movies." At the level of magnification shown in FIG. 1, no other category labels are displayed in connection with navigation object 122. Alternatively, a single navigation object at any given level may be divided into any number of areas or regions that represent any number of distinct or related categories or subcategories.

As described above, the navigation interface display system is suitably configured to allow an end user to increase and decrease the level of magnification of the navigation elements. The magnification levels may be discrete in number, or the display system may be capable of rendering navigation elements having substantially continuous and seamless variations in magnification. Different magnification levels may be selected by discrete remote control buttons, by selecting a region on the navigation element with a pointing device or remote control device, or by any suitable magnification control signal source. In this regard, if a query task 1306 determines that an increase magnification control signal has been received by the presentation layer, then a task 1308 may be initiated. If not, then a query task 1318 (described below) is performed.

In response to the increase magnification signal, the presentation layer and/or the navigation system causes the navigation element or a given navigation object to be magnified and rendered in more detail. In the current example, FIG. 1 represents a relatively low magnification level and FIG. 2 represents a relatively high magnification level. In addition to the general magnification of the navigation element, task 1308 causes the presentation layer and/or the navigation system to display inactive selection items from the "previous" level as active selection items on the current level. In other words, the number of active selection items on a given graphical feature preferably increases as the magnification level increases. In the example embodiment, a transition from one magnification level to the next higher magnification level results in the conversion all of the inactive selection items from the previous level into active selection items at the subsequent level. The same characteristic preferably applies when the end user desires to "skip" a magnification level. However, in addition to the rendering of inactive selection items as active selection items, skipping over a magnification level may cause an additional number of active selection items to appear on the resultant navigation element. Such additional active selection items may be associated with the inactive selection items that would have been displayed at the skipped magnification level. A task 1310 may also be performed to cause the presentation layer and/or the interface servers to display additional inactive selection items at the resultant magnification level. These additional inactive selection items preferably represent selection items that will be rendered as active selection items at higher magnification levels.

In addition to (or in place of) tasks 1308 and 1310, zoom process 1300 may perform a task 1312, which causes the presentation layer and/or the interface servers to subcategorize a number of selection items according to an appropriate scheme. As described above, a category such as "Movies" may be further divided into any number of subcategories, e.g., "Drama," "Mystery," and the like (see FIG. 2). In this respect, task 1312 may suitably separate or group active (or inactive) selection items according to a more detailed subcategory. Thus, selection items within the subcategory of "Drama" may be located on or proximate to a first area on the navigation object, while selection items within the subcategory of "Mystery" may be located on or proximate to a second area on the navigation object. The arrangement of selection items with respect to subcategories and respective areas on a navigation object may be a by-product of the navigation display design. Alternatively, the selection items can be dynamically grouped and positioned on a graphical feature in response to magnification level changes, other real-time operating parameters, user preferences, or any selection item filtering protocol. As described above, the navigation interface display system may render dividing lines on the navigation object, or divide the navigation object into a plurality of separate sub-objects, to further distinguish such subcategories. A task 1314 may also be performed to display the subcategory label or labels on or proximate to the particular areas of the navigation object, as shown in FIG. 2.

According to one aspect of the present invention, a task 1316 may be performed to suitably modify the appearance of a category label if desired. For example, at higher magnification levels, the label associated with a category may be repositioned, reduced, or removed to avoid the display of unintelligible portions of a word or truncated letters. Such modification of the broader category label may also be desirable to provide additional space on the navigation object for more selection items and subcategory labels. Following task 1316, zoom process 1300 may be re-entered at query task 1306.

As briefly mentioned above, query task 1318 is performed if query task 1306 does not detect an increase magnification control signal. If query task 1318 detects a decrease magnification control signal from the end user, then a task 1320 may be initiated. Otherwise, zoom process 1300 may be re-entered at query task 1306. In response to the decrease magnification request, the display system renders the navigation element in less detail than the previous rendering. In addition, task 1320, which is preferably performed by the presentation layer or by the interface servers, displays some of the active selection items from the previous magnification level as inactive selection items at the resulting lower magnification level. Alternatively, task 1320 may cause some of the active selection items from the previous level to be removed or hidden from view. In the example embodiment, this characteristic is exhibited when the user skips one or more levels while decreasing magnification of the navigation element. This characteristic is apparent in the transition from FIG. 2 to FIG. 1.

A task 1322 may also be performed to remove inactive selection items displayed at the previous level such that they are not displayed at the decreased magnification level. Although not reflected in FIGS. 1-3, an alternate embodiment may preserve inactive selection items for more than one magnification level. In view of the decreased magnification and decreased level of detail, a task 1324 may be performed to remove one or more subcategorization schemes associated with the selection items rendered on the given navigation object. Task 1324 may remove dividing lines rendered at the previous magnification level, regroup selection items in a consolidated or generalized manner, or the like. In addition, zoom process 1300 may perform a task 1326 to suitably remove one or more subcategory labels related to the selection items. The detailed information conveyed by such labels may not be desirable or necessary at the resulting magnification level. Finally, as described above in connection with task 1316, the presentation layer and/or the interface servers may modify the appearance of the category label if necessary to restore its format to one suitable for the lower magnification level (task 1328). Following task 1328, zoom process 1300 may be re-entered at query task 1306.

Figure 14:
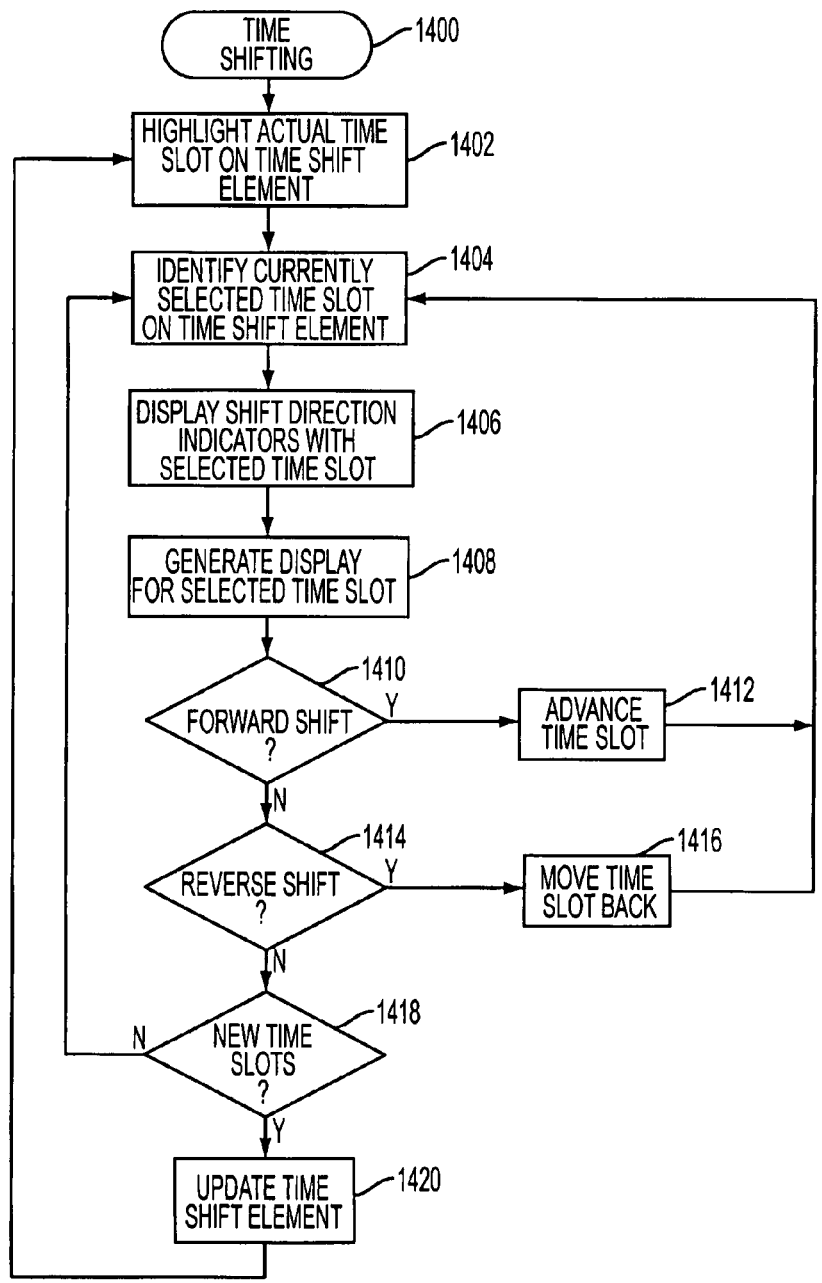
FIG. 14 is a flow diagram of a time shifting process.

FIG. 14 is a flow diagram of a time shifting process 1400 that may also be performed in connection with user interaction process 1200. Time shifting process 1400 may be performed in response to an end user keyboard entry or in response to a control signal from a remote control device. As described above with regard to FIGS. 9 and 10, time shifting process 1400 is preferably responsive to end user interaction with a time-shift element contained in the navigation display.

Regardless of the manner in which the end user enters a time shifting request, time shifting process 1400 preferably begins by highlighting or otherwise indicating the actual current time slot on the time-shift element (task 1402). As described above in connection with FIGS. 9 and 10, the preferred embodiment highlights the actual time slot with shading or coloring, and maintains the highlighting while the actual time slot remains current. Process 1400 also identifies the currently selected time slot on the time-shift element (task 1404). Since the currently selected time slot can be controlled by the end user, the navigation system identifies the current time slot in a suitable manner. For example, task 1404 may cause the current time slot to be highlighted, outlined, bold-faced, or colored differently than the remaining time slots.

Time shifting process 1400 may also cause the navigation system to render a number of shift direction indicators along with the currently selected time slot (task 1406). As shown in FIG. 9, a single direction indicator (e.g., an arrow) may be displayed if the selected time slot is the first or last slot on the time-shift element. Alternatively, as shown in FIG. 10, two directional indicators may be displayed if the selected time slot is an intermediate slot on the time-shift element. These directional arrows indicate whether the current time slot can be advanced or reversed.

The navigation system preferably generates a navigation element for the selected time slot (task 1408) for presentation to the end user. In accordance with one practical embodiment, time shifting process 1400 initially defaults to the actual time slot, automatically selects the actual time slot, and generates a "real-time" navigation element for display during task 1408. If process 1400 detects a forward shift request from the presentation device (query task 1410), then the current time slot will be advanced by the appropriate number of slots (task 1412). Thereafter, process 1400 may be re-entered such that tasks 1404, 1406, and 1408 can be repeated for the newly-selected time slot. In response to a newly-selected time slot, task 1408 causes the navigation system to modify the status of the selection items, programming information, pop-up labels and boxes, preview window, and/or other time-sensitive data rendered on the displayed interface. In a similar manner, a reverse shift request from the presentation device (query task 1414) causes the current time slot to be moved back by the appropriate number of slots (task 1416). Ultimately, a time reversal command will update and modify the navigation element to reflect the newly-selected time slot.

As the actual time progresses, the current time slot, a past time slot, or whichever time slot indicates the earliest period of time, may become stale or outdated. For example, the time-shift element 900 of FIG. 9 includes six discrete time slots. Over time, the earliest time slot will no longer be relevant. Accordingly, time shifting process 1400 preferably tests whether new time slots are to be displayed (query task 1418). If not, then process 1400 may be re-entered at task 1404 to continue monitoring for time shifting requests from the end user. If query task 1418 determines that one or more new time slots should be displayed, then the navigation system updates the time-shift element 900 in a suitable manner (task 1420). For example, task 1420 may remove the earliest time (e.g., the 8:00 PM slot shown in FIG. 9), shift the remaining time slots to the left, and add a new time in the latest time slot (e.g., an 11:00 PM time slot). Thus, the time-shift element may be dynamically updated in a substantially real-time manner. After the time-shift element is updated, time shifting process 1400 may be re-entered at task 1402 to highlight the new actual time slot.

Figure 15:
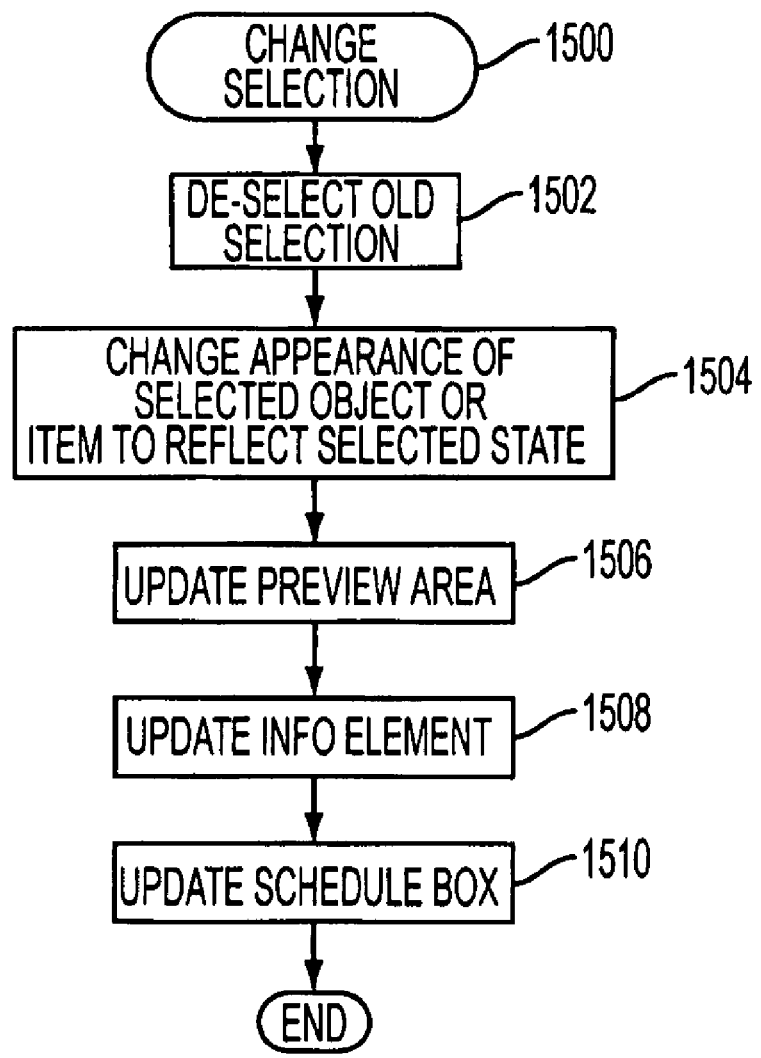
FIG. 15 is a flow diagram of a change selection process.

FIG. 15 is a flow diagram of a change selection process 1500 that may be performed by a navigation system according to the present invention. Process 1500 is performed when an end user travels between selection items and/or navigation objects displayed on the current navigation element. As described above, the navigation system is preferably configured such that the viewer can traverse between individual selection items on any number of navigation objects (and/or between individual navigation objects) using the directional buttons on the remote control.

Change selection process 1500 may begin by taking steps to eliminate features corresponding to the previously selected item. For example, the navigation system may de-select the previous selection item such that the previous selection item is no longer displayed as a selected item (task 1502). In this respect, task 1502 may remove any special highlighting, coloring, shading, or additional display elements that would otherwise be associated with a selected item.

In response to the new selection, process 1500 proceeds to change the characteristics of the selected item. For example, a task 1504 may be performed to add a selection graphic to the newly selected item or to otherwise change the appearance of the newly selected item. As described above, a selected item may be highlighted with shading, coloring, text, additional graphic elements, or the like. In the preferred embodiment, task 1504 causes the navigation system to distinguish the newly selected items from the remaining items in a visible manner. As described above in connection with FIGS. 4 and 5, the appearance of the new selection item may also reflect the current transmission status of the corresponding channel or station, the duration of the current program, and/or the amount of time elapsed or remaining in the current program.

In response to the new item selection, the navigation system may also update a preview area (e.g., preview area 108 in FIG. 1) to display, show, or play content related to the newly selected channel or station (task 1506). In addition, change selection process 1500 may update the information element 102 (task 1508) as necessary. Task 1508 may update the information element 102 with information related to the current program or channel corresponding to the new item. As described above in connection with FIG. 1, information element 102 may contain indicia related to the station call letters, the station name, the program title, the program starting and ending times, the duration of the program, and a summary description of the program. If the newly selected feature is a navigation object rather than a selection item, then information element 102 may be updated with a description of the contents or category associated with the current navigation object.

Change selection process 1500 may also cause the navigation display to update a schedule box corresponding to the currently selected channel or station. The schedule box may be formatted as a pop-up window that contains a chronological listing of programs carried on the selected channel. Consequently, if the user highlights a new channel, then the schedule box will be updated to reflect the programming for the new channel. As described above, the schedule box may be displayed when the user presses the "display" button on the remote control.

Figure 16:
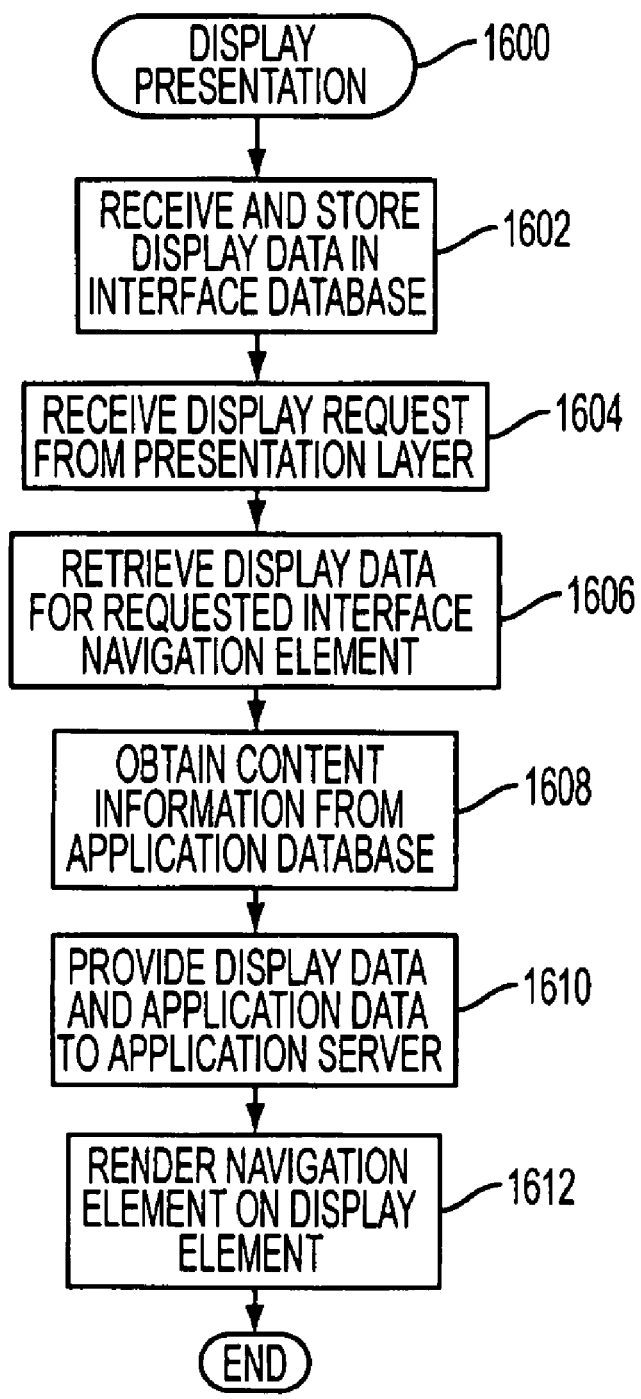
FIG. 16 is a flow diagram of an interface display presentation process according to one practical embodiment of the present invention.

FIG. 16 is a flow diagram of a navigation display presentation process 1600 that may be performed by a practical embodiment of the present invention. Process 1600 assumes that the navigation interface display system is configured in accordance with the architecture techniques described above. Although not a requirement of the display system, process 1600 is described herein in the context of a deployment to support one system administrator, e.g., one broadcast service provider such as a cable television company. In other words, although one display system may be deployed in a manner that supports a plurality of service providers, a realistic practical implementation will enable one service provider to support its subscribers in a centralized manner.

Presentation process 1600 preferably begins with a task 1602, during which the interface databases (see FIG. 6) receive and store navigation interface data associated with one or more deployed navigation elements. In the context of a deployment by a single service provider, the interface databases may include data related to any number of different users (indeed, each user may have a unique set of display preferences maintained by the display system). The interface databases may also contain navigation interface data related to any number of different navigation element preferences, configurations, designs, or the like, where such different navigation elements need not be associated with specific end users.

As described above, the interface servers receive a display request from an end user (task 1604) who wishes to view a particular navigation element. In the practical embodiment, such requests are generated by the respective presentation layer. The request includes a suitable navigation element identifier, such as an address, that enables the interface servers to extract the appropriate data from the interface databases. A task 1606 is performed to retrieve the interface data (from the interface databases) associated with the requested navigation element. As described above, the interface servers may utilize any number of known database management techniques to communicate with and extract data from the interface databases.

If necessary, presentation process 1600 performs a task 1608 to obtain content information from the application databases. Task 1608 obtains the content data associated with the current request. As described above, the application databases are typically externally-maintained databases associated with a specific presentation device, a particular content provider, or the like. For example, in a cable or satellite television deployment, an application database may contain current programming data that is updated on a daily basis. In one practical embodiment, the interface servers are suitably configured to interrogate the application databases and to extract the relevant data therefrom. The interface servers may process the relevant content data with the relevant navigation display data during process 1600.

After the interface servers obtain the content data and the navigation display data, a task 1610 may be performed to suitably provide such data to the applicable presentation layer. As described above, any number of conventional data communication protocols can be employed to carry out task 1610. In particular, task 1610 preferably provides the navigation display data and the content data to the application server associated with the respective presentation layer. Eventually, a task 1612 is performed by the respective presentation device to suitably render the navigation element on the corresponding display element. In connection with task 1612, the respective application server has generated navigation display data in a manner that is recognizable by the presentation device. Thus, the presentation device need not be specially configured to receive or process the display data. Rather, the presentation device merely renders the navigation element display data in a manner that is consistent with the rendering of other graphical elements on the display element.

Figure 17:
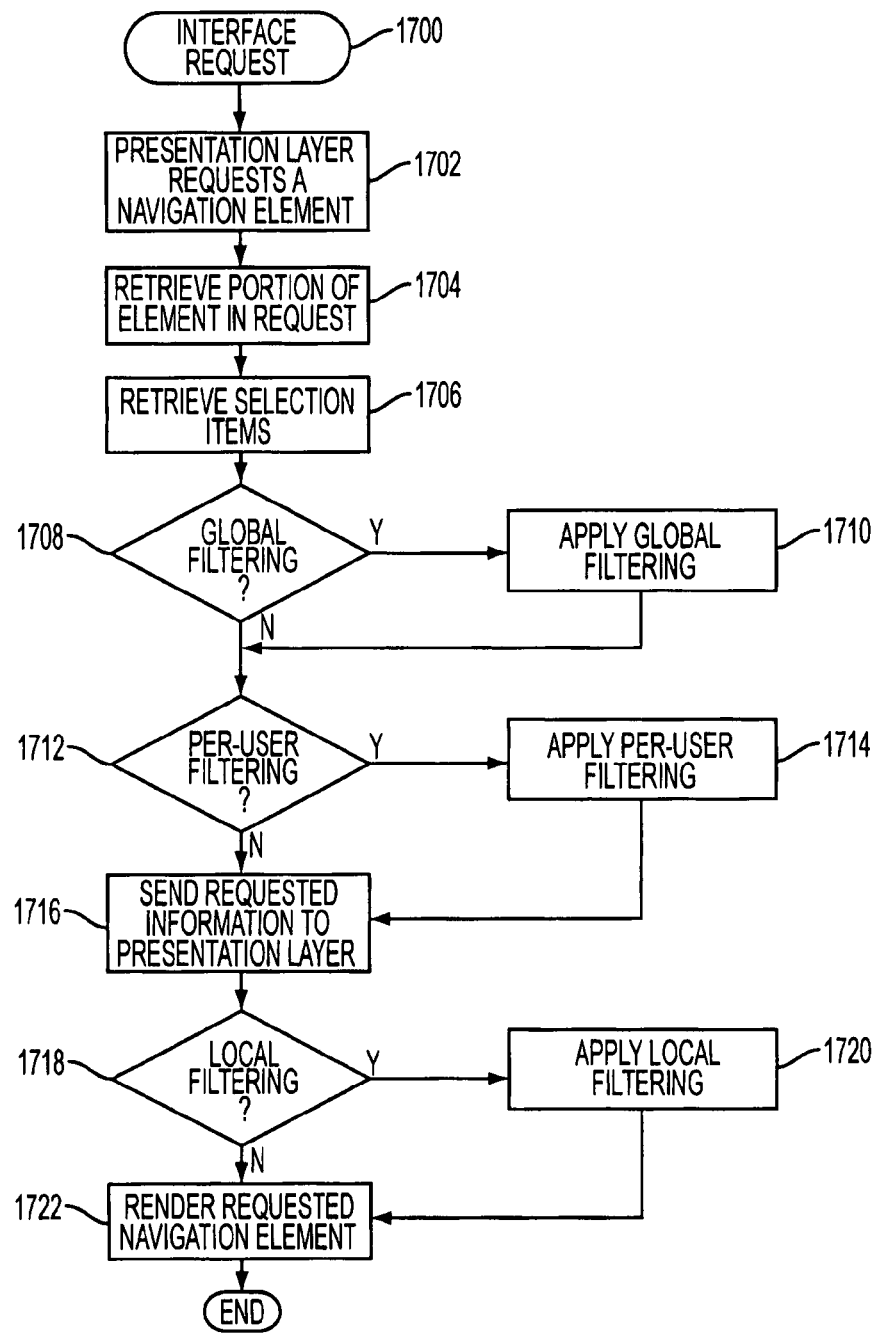
FIG. 17 is a flow diagram of an interface request process.

FIG. 17 is a flow diagram of a navigation interface request process 1700 that may be performed by a navigation interface display system according to the present invention. Process 1700 (or portions thereof) may be performed in conjunction with presentation process 1600. Process 1700 may begin when a presentation layer requests a navigation element (task 1702). In the preferred embodiment, each navigation element can be requested using a designated address or identifier. In response to the request, the system retrieves at least a portion of the requested navigation element (task 1704) and the selection items located in that portion of the requested navigation element (task 1706). Due to the potentially large size of an overall navigation element, different zoom levels, and potentially large number of active and inactive selection items, it may not be possible to efficiently retrieve all of the information associated with the requested navigation element. Thus, tasks 1704 and 1706 enable the system to retrieve a portion or a subset of the requested navigation element. For example, tasks 1704 and 1706 may retrieve the lowest resolution navigation element and a relatively small number of selection items for initial display to the end user.

If global selection item filtering is required (query task 1708), then a task 1710 may be performed to apply any necessary global filtering to the current navigation element. In addition, if per-user or individual selection item filtering is required (query task 1712), then a task 1714 may be performed to apply such filtering. As described above, the interface servers preferably apply global filtering (i.e., filtering that is automatically applied to a number of users) and any user-specified or individual filtering to the requested navigation element. The filtering may reduce the number of selection items or otherwise modify the navigation element data retrieved by the system.

Eventually, the system sends the requested interface information back to the requesting presentation layer (task 1716). Thereafter, the presentation layer may test whether to apply local filtering to the received selection items and/or to the received display data (query task 1718). If so, then the presentation layer can apply any required local filtering (task 1720). As mentioned previously, local filtering may be specific to the particular presentation layer, presentation device, or user preferences.

Following any local filtering, the presentation layer processes the navigation element information and renders the navigation element using any number of two-dimensional or three-dimensional graphics rendering techniques (task 1722). Of course, request process 1700 (or portions thereof) may be repeated for any number of subsequent requests for different navigation elements or for different portions of the same navigation element.

The present invention has been described above with reference to a preferred embodiment. However, those skilled in the art having read this disclosure will recognize that changes and modifications may be made to the preferred embodiment without departing from the scope of the present invention. These and other changes or modifications are intended to be included within the scope of the present invention, as expressed in the following claims.

What is claimed is:

1. An interactive program guide for television programming, the interactive program guide being executable on one or more processors and comprising:
    a display region configured to display a plurality of selection items corresponding to a plurality of media items;
    a first subset of said selection items rendered on said display region as selection items at a first hierarchical level;
    a second subset of said selection items rendered on said display region as selection items at a second hierarchical level; and
    a zoom function for transitioning between said first hierarchical level and said second hierarchical level by progressively scaling and displaying at least one of said first subset of selection items to provide a visual impression of movement of said at least one of said first subset of selection items toward an observer,
    wherein said first and second hierarchical levels respectively correspond to different magnification levels,
    wherein at least one of said selection items is displayed at both said first hierarchical level and said second hierarchical level, and further wherein said at least one of said selection items is displayed at said second hierarchical level with a visual characteristic, other than a change in magnification, that differs from the manner in which said at least one of said selection items was displayed at said first hierarchical level,
    wherein said region configured to display said plurality of selection items is configured to display said plurality of selection items asymmetrically such that said plurality of selection items are not arranged in a symmetrical rectangular format in at least one of said hierarchical levels, and
    wherein said plurality of selection items are dynamically populated such that at least one of said plurality of selection items vary over time.

2. An interactive program guide according to claim 1, further comprising:
    a third subset of said selection items rendered on said display region as inactive selection items at said first hierarchical level,
    wherein said inactive selection items are rendered on said display region in a visually distinguishable manner relative to active selection items.

3. An interactive program guide according to claim 1, wherein said second subset includes said first subset of selection items.

4. An interactive program guide according to claim 1, wherein a prioritization metric determines said first and second subsets.

5. A non-transitory computer-readable medium containing instructions associated with an interactive guide for television programming which, when executed by a processor, perform the steps of:

displaying a plurality of selection items corresponding to a plurality of media items in at least one of a plurality of hierarchical levels and asymmetrically such that said plurality of selection items are not arranged in a symmetrical rectangular format including:
   a first subset of said selection items rendered on a display region as selection items at a first hierarchical level; and
   a second subset of said selection items rendered on said display region as selection items at a second hierarchical level; and
transitioning between said first hierarchical level and said second hierarchical level using a zoom function by progressively scaling and displaying at least one of said first subset of selection items to provide a visual impression of movement of said at least one of said first subset of selection items toward an observer,
wherein said first and second hierarchical levels respectively correspond to different magnification levels,
wherein at least one of said selection items is displayed at both said first hierarchical level and said second hierarchical level, and further wherein said at least one of said selection items is displayed at said second hierarchical level with a visual characteristic, other than a change in magnification, that differs from the manner in which said at least one of said selection items was displayed at said first hierarchical level, and
wherein said plurality of selection items are dynamically populated such that at least one of said plurality of selection items vary over time.

6. A non-transitory computer-readable medium according to claim 5, further comprising:
   a third subset of said selection items rendered on said display region as inactive selection items at said first hierarchical level,
   wherein said inactive selection items are rendered on said display region in a visually distinguishable manner relative to active selection items.

7. A non-transitory computer-readable medium according to claim 5, wherein said second subset includes said first subset of selection items.

8. A non-transitory computer-readable medium according to claim 5, wherein a prioritization metric determines said first and second subsets.

9. A method comprising:
displaying a plurality of selection items corresponding to a plurality of media items in at least one of a plurality of hierarchical levels and asymmetrically such that said plurality of selection items are not arranged in a symmetrical rectangular format including:
   a first subset of said selection items rendered on a display region as selection items at a first hierarchical level; and
   a second subset of said selection items rendered on said display region as selection items at a second hierarchical level; and
transitioning between said first hierarchical level and said second hierarchical level using a zoom function by progressively scaling and displaying at least one of said first subset of selection items to provide a visual impression of movement of said at least one of said first subset of selection items toward an observer,
wherein said first and second hierarchical levels respectively correspond to different magnification levels,
wherein at least one of said selection items is displayed at both said first hierarchical level and said second hierarchical level, and further wherein said at least one of said selection items is displayed at said second hierarchical level with a visual characteristic, other than a change in magnification, that differs from the manner in which said at least one of said selection items was displayed at said first hierarchical level, and
wherein said plurality of selection items are dynamically populated such that at least one of said plurality of selection items vary over time.

10. The method according to claim 9, further comprising:
a third subset of said selection items rendered on said display region as inactive selection items at said first hierarchical level,
wherein said inactive selection items are rendered on said display region in a visually distinguishable manner relative to active selection items.

11. The method according to claim 9, wherein said second subset includes said first subset of selection items.

12. The method according to claim 9, wherein a prioritization metric determines said first and second subsets.

* * * * *